United States Patent [19]

Suetsugu et al.

[11] Patent Number: 5,850,618
[45] Date of Patent: Dec. 15, 1998

[54] NAVIGATION DEVICE

[75] Inventors: Masahiro Suetsugu; Kyoumi Morimoto, both of Nishio; Hiroaki Kondo, Tokyo, all of Japan

[73] Assignee: Aisin AW Co., Ltd., Aichi-ken, Japan

[21] Appl. No.: 579,675

[22] Filed: Dec. 28, 1995

[30] Foreign Application Priority Data

Dec. 28, 1994 [JP] Japan .................................. 6-329132
Jun. 30, 1995 [JP] Japan .................................. 7-188014

[51] Int. Cl.$^6$ .............................................. G06F 165/00
[52] U.S. Cl. .......................... 701/210; 701/209; 701/211; 701/212; 701/200; 701/202
[58] Field of Search ............................ 364/449.3, 449.4, 364/449.5, 449.6, 460, 444.1, 444.2, 443

[56] References Cited

U.S. PATENT DOCUMENTS

| | | | |
|---|---|---|---|
| 5,177,685 | 1/1993 | Davis ........................................ | 364/443 |
| 5,189,430 | 2/1993 | Yano et al. ................................ | 342/457 |
| 5,212,643 | 5/1993 | Yoshida .................................... | 364/449 |
| 5,272,638 | 12/1993 | Martin et al. ............................. | 364/444 |
| 5,406,491 | 4/1995 | Lima ........................................ | 364/449 |
| 5,410,485 | 4/1995 | Ichikawa .................................. | 364/444 |
| 5,537,324 | 7/1996 | Nimura et al. ............................ | 364/449 |
| 5,559,707 | 9/1996 | DeLorme et al. ......................... | 364/443 |
| 5,608,635 | 3/1997 | Tamai ....................................... | 364/449.3 |

FOREIGN PATENT DOCUMENTS 61-194473  8/1986  Japan .

Primary Examiner—Kevin J. Teska
Assistant Examiner—Russell W. Frejd

[57] ABSTRACT

Goals desired by a user are searched based on the search reference data that serve as reference for searching the goals, the order of priority of the goals is determined from a relationship between the data of goals and the data of a reference position, and the data of the thus determined order of priority are indicated. Even when the car is running, therefore, the user is allowed to easily select within a short time the goals that conform to his desire with reference to the order of priority. Accordingly, the user can devote himself to driving. When the goals are to be indicated, a map scale is so determined that the goals are indicated in a predetermined number or in a number not less than the predetermined number, and the goals are indicated on the map of this scale. Therefore, the scale of the map picture indicating the goals is automatically so adjusted, and can be easily discerned by the user. Therefore, the user is liberated from the need to manually adjust the reduced scale.

27 Claims, 34 Drawing Sheets

FIG. 2

| | |
|---|---|
| MAP DATA FILE | F1 |
| INTERSECTION DATA FILE | F2 |
| NODE DATA FILE | F3 |
| ROAD DATA FILE | F4 |
| PHOTOGRAPHIC DATA FILE | F5 |
| GOAL DATA FILE | F6 |
| GUIDE POINT DATA FILE | F7 |
| DETAILED GOAL DATA FILE | F8 |
| ROAD NAME DATA FILE | F9 |
| BRANCHING POINT NAME DATA FILE | F10 |
| ADDRESS DATA FILE | F11 |
| TOLL No./LOCAL OFFICE No. LIST FILE | F12 |
| PRIVATE PHONE No. DATA FILE | F13 |
| MARK DATA FILE | F14 |
| POINT DATA FILE | F15 |
| OBJ. PLACE DATA FILE | F16 |

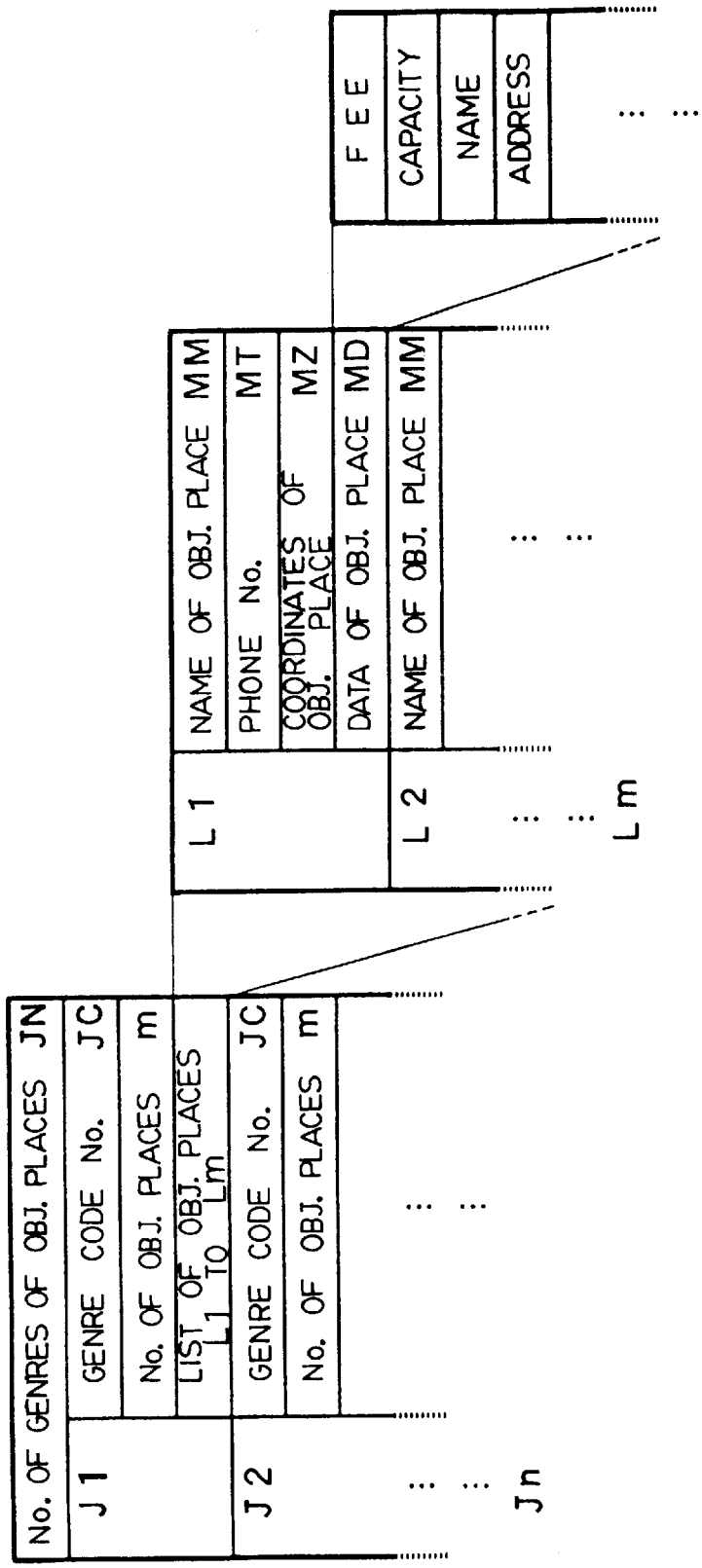

FIG. 4

RAM4

| | | | |
|---|---|---|---|
| EXTERNAL DATA | GD | PRESENT POS. | MP |
| ABSOLUTE DIRECTION | ZD | ANGLE OF RELATIVE DIRECTION | $\theta 1$ |
| DISTANCE TRAVELED | ML | ACCELERATION | ma |
| DATA RELATED TO THE PRESENT POS. | PI | VICS DATA | VD |
| ATIS DATA | AD | GOAL | TP |
| OBJ. PLACE | SP | GUIDE ROUTE | MW |
| GENRE CODE No. | JC | AREA DESIGNATION | AS |
| SUB-REF. | KS | REF. POS. | KP |
| DATA RELATED TO ROADS | RD | RUNNING SPEED | V |
| AREA TO BE SEARCHED | KA | SEARCHED OBJ. PLACE | KM |
| DIST. TO OBJ. PLACE | TK | ORDER OF PRIORITY | UN |
| ANGLE OF OBJ. PLACE | $\theta 2$ | DIRECTION OF OBJ. PLACE | $\theta$ |
| KEEP THE GOAL | MK | COORDINATE DIFFERENCE | (Xna,Yna) |
| MAX. COORDINATE DIFFERENCE | (Xka,Yka) | DIST. | L |

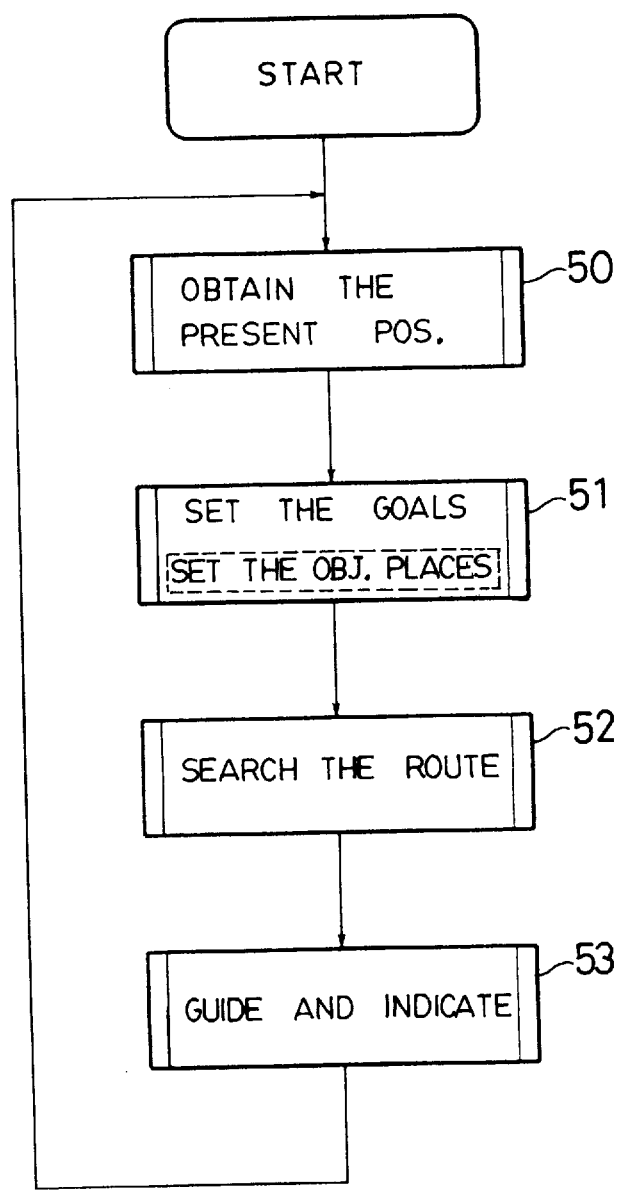

| | | NAME | PHONE No. | RANK | RETURN |
|---|---|---|---|---|---|
| △ | 1 | A A A | ○○○-×××-0000 | 5 | 67 |
| | 2 | B B B | ○○○-×××-0000 | 3 | |
| | 3 | C C C | ○○○-×××-0000 | 4 | |
| | 4 | D D D | ○○○-×××-0000 | 2 | |
| | 5 | E E E | ○○○-×××-0000 | 3 | |
| | 6 | F F F | ○○○-×××-0000 | 4 | |
| | 7 | G G G | ○○○-×××-0000 | 1 | |
| | 8 | H H H | ○○○-×××-0000 | 4 | |
| ▽ | 9 | I I I | ○○○-×××-0000 | 3 | |

FIG. 34

ROM 3, 5

| DIST. L(m) BETWEEN THE PRESENT POS. AND THE OBJ. PLACE | REDUCED SCALE |
|---|---|
| 0 ≦ L < 300 | 1 : 10,000 |
| 300 ≦ L < 800 | 1 : 20,000 |
| 800 ≦ L < 1500 | 1 : 40,000 |
| 1500 ≦ L < 3000 | 1 : 80,000 |
| 3000 ≦ L < 6000 | 1 : 160,000 |
| 6000 ≦ L < 10000 | 1 : 320,000 |
| 10000 ≦ L < 20000 | 1 : 640,000 |
| 20000 ≦ L | 1 : 80,000 |

ND DEVICE

BACKGROUND OF THE INVENTION

1. Field of the Invention

The present invention relates to a navigation device for indicating the order of priority of goals on a map picture, and to a navigation device for automatically adjusting the scales of map pictures on which goals are indicated.

2. Description of the Background Art

In conventional navigation devices, a user inputs the goals before departure. Therefore, a route is set from a point of departure to the goals, and the route is guided. The goals input before departure include a final goal and passing places to the final goal.

The user may drop in e.g. a restaurant or a shop in his route to the final goal. In this case, the user inputs the places to drop in. Therefore, the navigation device interrupts the guidance operation up to the final goal. And then, the route to the place where the user drops in is guided. When the places to drop in are inputted, first, the user inputs the genre. The navigation device searches the places that conform the genre. Then, the places that conform the genre are indicated on the map picture.

According to the conventional navigation devices, however, predetermined marks are simply indicated on places that conform with the designated genre. When a plurality of marks are indicated, therefore, it is difficult for the user to select quickly a place that conforms to his desire. Therefore, the user is forced to select a place out of the marked places according to whether it conforms to his desire or not. Or, the user must at once stop his car. Then, the user calls up descriptive images related to the marked places, and must then determine his desired place while looking at the descriptive images.

When places that conform to the designated genre are indicated on the conventional navigation device, furthermore, the reduced scale of a map picture is that of the initial picture or that of the map picture that had been displayed till then. Many marks are indicated when the map picture has a large scale. Therefore, the user finds it difficult to select a goal out of them. When the map picture has a small scale, on the other hand, there are often no places that conform to the designated genre in this map picture. The user therefore must change the scale of the map picture by hand so that a number of marks could be indicated and easily recognized.

SUMMARY OF THE INVENTION

The present invention was accomplished in order to solve the above-mentioned problems. The object of the present invention is to easily and quickly select the goal that conforms to the desire of the user, and to automatically adjust the scale of the map picture on which the goals are indicated.

In order to achieve the above-mentioned object according to the present invention, the order of priority of goals is determined from a relationship between the data related to goals and the data related to a reference position, and is indicated. Thus, the order of priority of objective places is indicated depending upon the desire of the user, such as distance, kind of business, etc. The user is then allowed to select the goals that conform to his desire within short periods of time.

According to the present invention, furthermore, the scale of the map picture indicating the goals is automatically adjusted so that it can be easily watched by the user. Therefore, the user is not required to adjust the scale by his hand.

BRIEF DESCRIPTION OF THE DRAWINGS

FIG. 2 is a diagram illustrating data files stored in an external storage medium;

FIG. 3 is a diagram illustrating a data file F16 of objective places;

FIG. 4 is a diagram illustrating data stored in a RAM 4;

FIG. 5 is a flow chart illustrating the whole processing;

FIG. 34 illustrates a data table used for adjusting the scale;

POS: POSITION, PRO: PROCESSING, COM: COMMUNICATION,

TRANS: TRANSMISSION, REC: RECEPTION, OBJ: OBJECTIVE,

REF: REFERENCE, DET: DETERMINE, No: NUMBER,

DIST: DISTANCE.

DESCRIPTION OF THE PREFERRED EMBODIMENTS

Summary of the Embodiments

Figure 6:
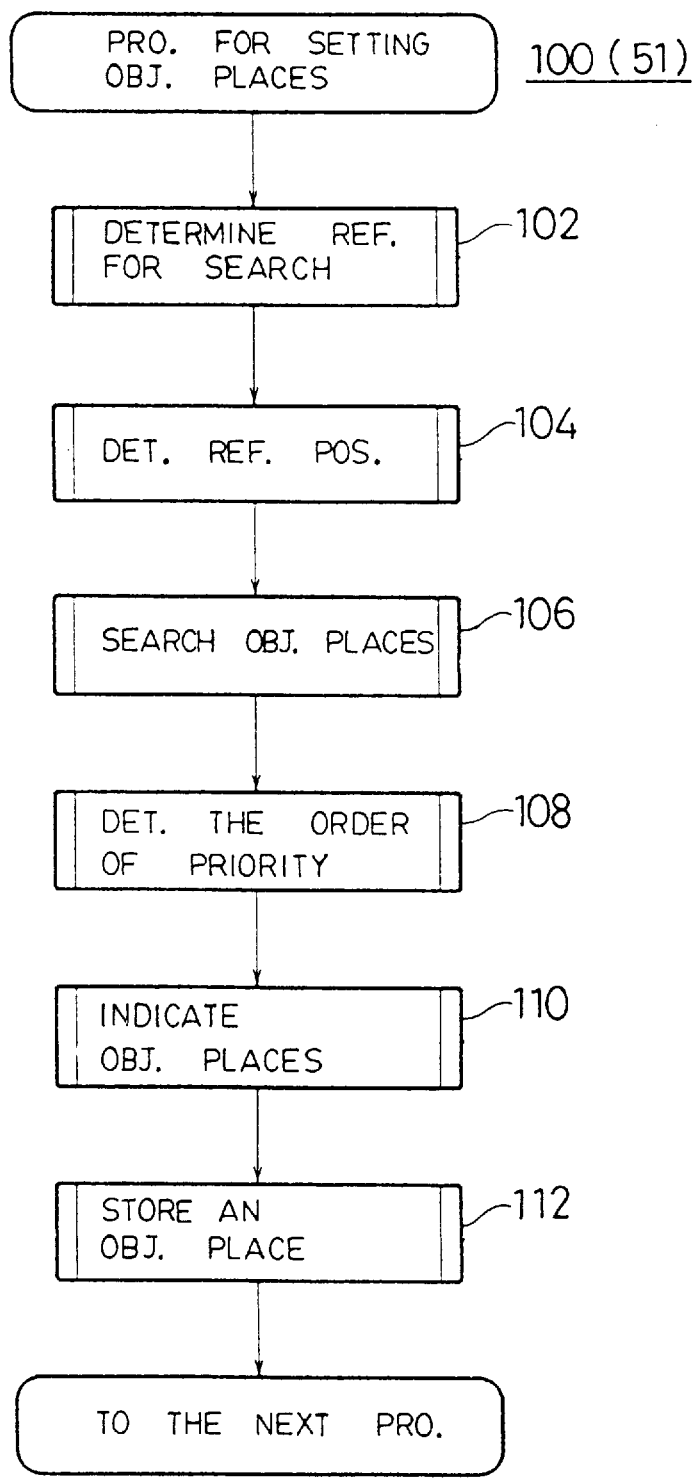
FIG. 6 is a flow chart illustrating the processing for setting objective places executed according to a first embodiment.

A user inputs the genre of objective places, range to be searched and any other references of search (step 102 in FIG. 6). Then, a reference position that is set by the user or is automatically set becomes the center of search area (step 104 in FIG. 6). Objective places are searched from the search area (step 106 in FIG. 6). Those places that conform to the reference for search are selected out of the searched objective places, and are weighted depending upon the reference of search (steps 230, 234, 238, 254, 258, 262 in FIGS. 13 and 14). Thus, the order of priority is given to the objective places (step 108 in FIG. 6). The searched objective places are indicated together with the order of priority (step 110 in FIG. 6). The user selects a desired objective place with reference to the order of priority that is indicated (step 112 in FIG. 6). The selected objective place is stored (step 112 in FIG. 6). Then, the route is navigated up to the objective places that are stored (FIG. 5).

Figure 22:
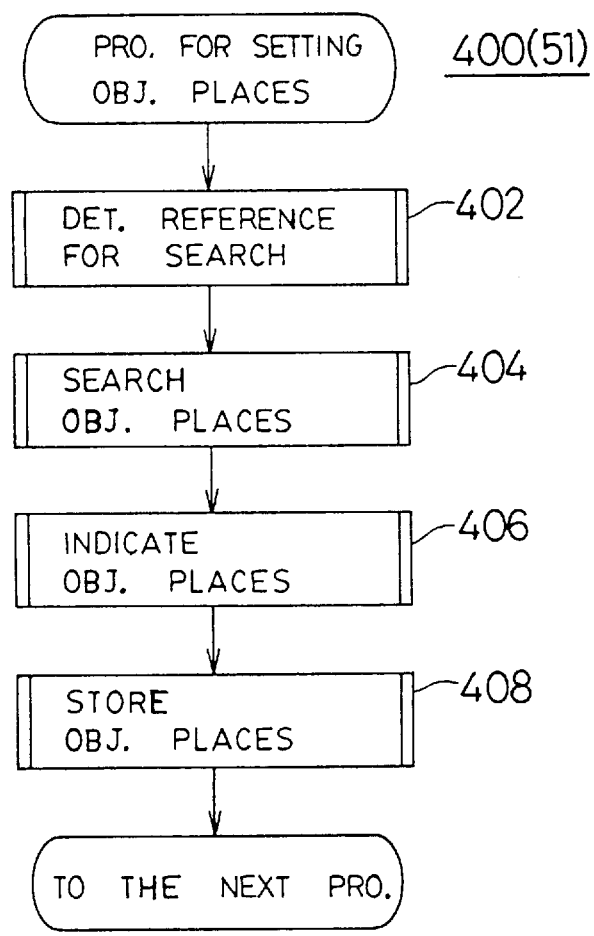
FIG. 22 is a flow chart illustrating the processing for setting objective places executed according to a second embodiment.

The user inputs the genre of objective places (step 402 in FIG. 22). The data related to the objective places are searched depending upon the designated genre (step 404 in FIG. 22). The searched objective places are indicated on a display 33 (step 406 in FIG. 22). At this moment, the reduced scale of the map is automatically adjusted, and searched objective places of a number greater than Z are indicated on the map picture (steps 454 and 456 in FIG. 26).

Here, the goals include a final goal, passing places and objective places. The final goal is a place at which the user will finally arrive relying upon the navigation device. A passing place or an objective place may often be the final goal. The passing places are those points where the user will pass in his course to the final goal. The user passes through the passing places in his course to the final goal. The final goal and the passing places are input through the operation for setting the goals before the departure. The objective places have not been scheduled before the departure, and are places where the user suddenly wishes to drop in while driving through the route to his final goal.

1. Whole Circuit.

Figure 1:
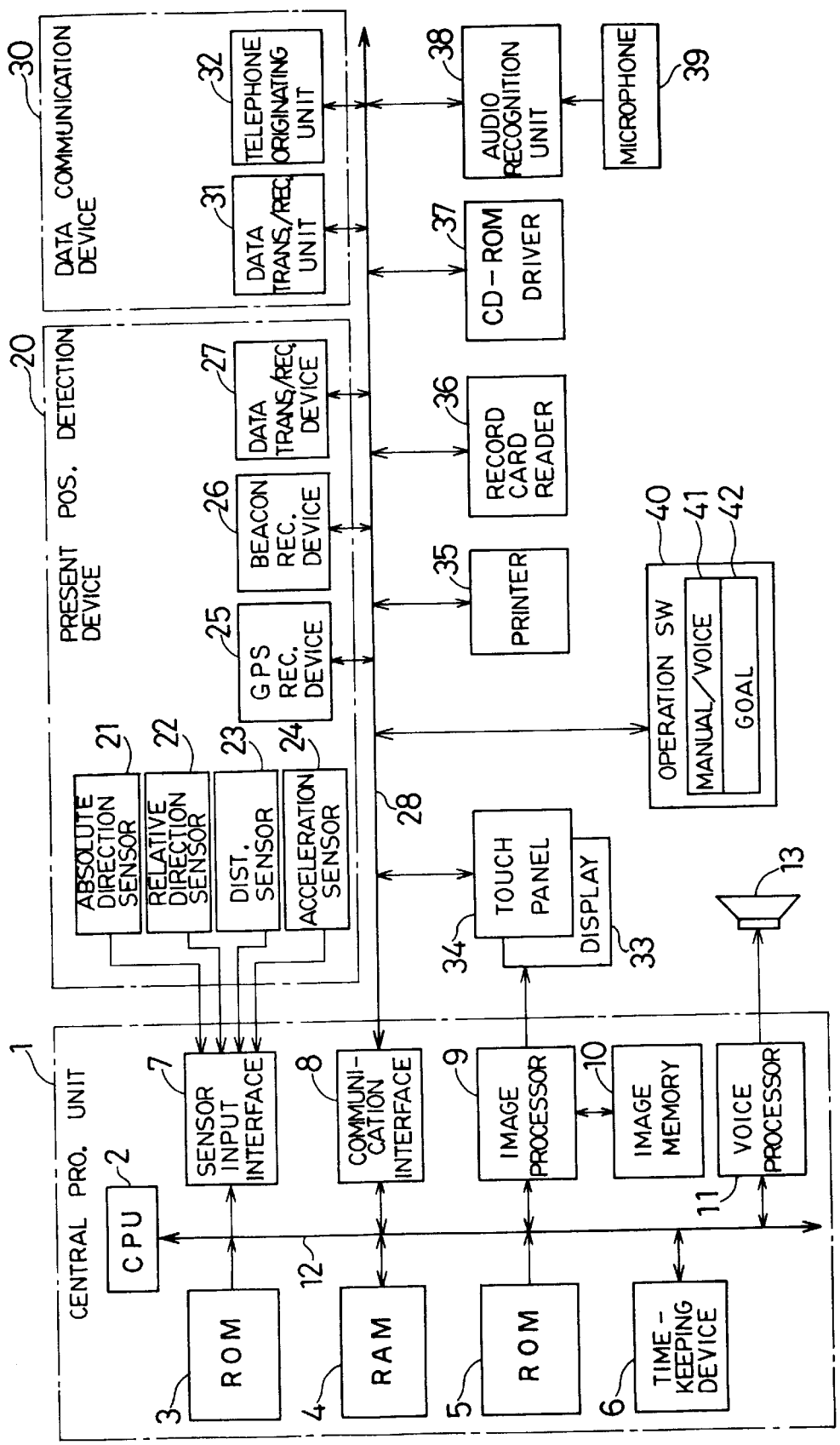
FIG. 1 is a diagram illustrating the whole circuit of a navigation device.

FIG. 1 is a diagram illustrating the whole circuit of the navigation device. A central processing unit 1 includes a CPU 2 which controls the operation of the navigation device and executes the arithmetic operation. ROMs 3 and 5 store system programs executed by the CPU 2, a variety of parameters (data), and data for indication control, voice guidance control, route guidance control and map indication control. A RAM 4 stores the data input from external units, a variety of parameters (data) used for arithmetic operation and the results of operation. A time-keeping device 6 generates data related to the time. A sensor input interface 7 receives the detection data from an absolute direction sensor 21, a relative direction sensor 22, a distance sensor 23 and an acceleration sensor 24 in a present position detection device 20, and sends the data to the CPU 2. A communication interface 8 transmits and receives various data to and from the units connected thereto via a data bus 28.

An image processor 9 reads the image data stored in an image memory 10 and sends them to a display 33. The display 33 is a device capable of displaying images and may be a CRT, a liquid crystal display or a plasma display, etc.. The image memory 10 stores image data displayed on the display 33, and transmits and receives image data to and from the image processor 9. In response to an instruction from the CPU 2, the image processor 9 converts the data related to goals and data related to roads into data for display, and forms image data to be displayed on the display 33. At this moment, surrounding images of the picture on the display 33 are also formed and are stored in the image memory 10. Therefore, it is enabled to scroll the picture. A voice processor 11 receives data related to waveforms of synthesized voice read out by the CPU 2 from the ROMs 3 and 5, forms analog voice waveforms, and sends them to a speaker 13.

The present position detection device 20 detects the present position of the car, and obtains the data related to longitude and latitude. The absolute direction sensor 21 is for example a terrestrial magnetism sensor. And this sensor 21 detects for example terrestrial magnetism, and outputs data that represents south-north direction which serves as an absolute direction. The relative direction sensor 22 is for example an angle-of-steering sensor which detects the angle of steering, or a gyroscopic device such as a piezo-electric oscillation gyroscope. And this sensor 22 outputs data representing a difference in the direction of progress of the car from the absolute direction detected by the absolute direction sensor 21. The distance sensor 23 is for example a digital counter which is interlocked to an odometer, and outputs data related to a distance traveled by the car. The acceleration sensor 24 is for example a semiconductor acceleration sensor, and detects the acceleration of the car.

A GPS reception device 25 receives signals from the GPS (global positioning system), and outputs data related to the position. A beacon reception device 26 receives correction data from the GPS and beacon waves from an information offering system such as VICS (vehicle information and communication system), and outputs the received data. A data transmission/reception device 27 transmits and receives data related to the present position to and from a bidirectional system for offering data related to the present position.

A data communication device 30 transmits and receives signals to and from VICS and ATIS (advanced traffic information system). A data transmission/reception unit 31 is, for example, a transmitter/receiver of VICS, and a telephone originating unit 32 is, for example, a communication unit of ATIS.

A transparent touch panel 34 is provided on the display 33. The touch panel has transparent touch switches that are arranged on a plane in the form of a matrix. A printer 35 prints various data such as a map and a guide to facilities that are received through the communication interface 8. A record card reader 36 reads a recording medium of the shape of a card such as IC card, ROM card, memory card and the like cards. A CD-ROM driver 37 is a device for reading a CD-ROM which is a recording medium of the form of CD (compact disk). The CR-ROM driver 37 may be replaced by a reader for reading a recording medium such as an optical disk or a magnetic disk other than the CD-ROM.

An audio recognition unit 38 converts the voice picked up by a microphone 39 into digital signals, and discriminates whether a voice that is in agreement with a predetermined command is input or not. When the voice that is in agreement with the command is input, the audio recognition unit 38 sends command data to the CPU 2. The audio recognition unit 38 may be either of a system for recognizing specified talkers or of a system for recognizing unspecified talkers.

An operation switch 40 is a wired remotely controlled switch, a wireless remotely controlled switch or a manual switch arranged to surround the display 33. The operation switch 40 is used for instructing operations other than the contents operated on the touch panel 34 such as menu display, picture quality adjustment, starting of operation for setting the goals, etc.

2. External Storage Medium

The external storage medium such as the above-mentioned card-type storage medium or the CD-ROM stores various data files that are shown in FIG. 2. A map data file F1 stores map data such as road map of the whole of a country. An intersection data file F2 stores data related to intersections such as positions and names of intersections. A node data file F3 stores data related to nodes set on the roads. A road data file F4 stores data related to the roads such as positions and kinds of the roads, number of lanes, connection among the roads, etc. A photographic data file F5 stores picture data of photographs of various facilities, sight-seeing resorts, principal intersections, etc..

The goal data file F6 stores the data related to goals, names of goals, and data representing goals such as marks and figures. The data related to the goals include places of principal sight-seeing resorts, buildings, companies and sites of businesses listed in a telephone book, kinds of facilities and businesses, etc. In a processing for setting the goals (step 51) that will be described later, the final goals or the passing places are searched from the goal data file F6. A guide point data file F7 stores the data such as the contents of guide boards installed along the road and guide data related to branching points, etc.. A detailed goal data file F8 stores detailed data related to the goals that are stored in the goal data file F6. A road name data file F9 stores the data related to the names of principal roads in the road data stored in the road data file F4. A branching point name data file F10 stores the data related to the names of principal branching points. An address data file F11 stores the address data for searching the goal data stored in the goal data file F6 based upon addresses.

A toll number/local office number list file F12 stores the data related to toll number and local office number of the goals stored in the goal data file F6. A private phone number data file F13 stores the data related to private phone numbers of clients, etc. The phone number data are input by the user through manual operation. A mark data file F14 stores the data of positions and names related to marked points or points which the user desires storing to the RAM 4. These data are input by the user through manual operation. A point data file F15 stores detailed data of marked points stored in the mark data file F14.

An objective place data file F16 stores the data related to positions of objective places such as gas stations, convenience stores, parking zones, etc. and their descriptions. A processing for setting the objective places (step 100) that will be described later determines the places to drop in out of the objective places stored in the objective place data file F16. The objective place data file F16 stores the data related to points or facilities that are not stored in the goal data file F6. The data stored in the objective place data file F16 may often be partly or entirely overlapping on the data of goals stored in the goal data file F6.

The map data file F1 stores map data on a plurality of different scales for the same area. For instance, the map data file F1 stores map data of seven different scales, e.g., a scale of 1 to 10,000, a scale of 1 to 20,000, a scale of 1 to 40,000, a scale of 1 to 80,000, a scale of 1 to 160,000, a scale of 1 to 320,000 and a scale of 1 to 640,000. The greater the scale, the finer the map; i.e., the map contains data of narrow roads and local points.

The coordinates of road data and goal data stored in the data files are those of longitude and latitude as well as those that are determined on the coordinate system depending upon the maps of different scales. Therefore, there are stored, for each goal, the data related to coordinates of longitude and latitude as well as a plurality of coordinate data for each scale. The coordinate systems of the maps are determined using predetermined reference points in the maps that are stored as origins. The reference point remains the same irrespective of the scales of the maps. An x-y coordinate system is set on the image of a frame on the display 33. The coordinates of points are determined based on the x-y coordinate system. The picture of a frame on the display 33 has a predetermined size. When the map has different scales, therefore, the point on the same coordinate could become a different point. For example, a point on a coordinate (Xt, Yt) on the map drawn on a scale of 1 to 20,000 could become (2Xt, 2Yt) on a map drawn on a scale of 1 to 10,000.

3. Objective Place Data File

FIG. 3 illustrates detailed contents stored in the objective place data file F16. The objective places are classified into a plurality of genres. The data related to the number of genres JN represent the number of classifications. The genres stand for kinds of facilities or places where the user may drop in while driving. The genres many include to, for example, gas stations, convenience stores, parking zones, motels, hotels, restaurants, hamburger shops, coffee shops, railway stations, entrances to subway stations, hospitals, parks, police stations, post offices, pools, tennis courts, golf courses, golf practice ranges, temples and shrines, drug stores, pharmacies, etc. The genres J1 to Jn store genre code number data JC, data m related to the number of objective places, and data L1 to Lm related to the list of objective places, that are determined for each of the genres.

The data L1 to Lm related to the list of objective places store the data MM related to the names of objective places, the data MT related to the phone numbers of objective places, the data MZ related to coordinates of objective places on the map, and detailed data MD of objective places for each of the objective places of a number m. The data MM related to the names of objective places store the data such as characters, figures and marks representing the objective places. The data MD related to the objective places include detailed data related to objective places that are classified into a plurality of items. These items serve as conditions for selection, and include fees of objective places, capacities of facilities (number of cars that can be parked, number of persons that can be accommodated, width, height, length of a car that can be parked, etc.), brands (names of companies supplying petroleum to the gas stations, names of chain stores, etc.), addresses, contents of services, whether a parking lot is available or not, business time, kinds of dishes served in restaurants, data related to restaurants (whether they are of high grades or not, whether they are chain shops or not, whether famous cooks are employed or not), names of convenience stores, etc.

4. Data Groups

FIG. 4 illustrates groups of data stored in the RAM 4. Onto the external data GD are copied whole or part of the data stored in the external storage medium. The external data GD are read out by the above-mentioned record card reader 36 or the CD-ROM driver 37. The data MP related to the present position are data representing the present position of the car and are detected by the present position detection device 20. The data ZD related to the absolute direction are those indicating the south-and-north direction, and are found based upon the data from the absolute direction sensor 21. The data $\theta 1$ related to the angle of relative direction represent the angle of direction of progress of the car relative to the absolute direction, and are found based upon the data from the relative direction sensor 22. The data ML related to the distance traveled represent the distance traveled by the car and are found based upon the data from the distance sensor 23. The data ma related to acceleration represent acceleration of the car, and are detected by the acceleration sensor 24. The data PI related to the present position are input from the beacon reception device 26 or the data transmission/reception device 27. The VICS data VD are those of VICS input from the data transmission/reception unit 31. The ATIS data AD are those of ATIS input from the telephone originating unit 32. The goal data TP are those related to the goals such as positions and names of the goals, and are input by the user.

The data SP related to objective places are those related to the objective places such as positions and names of the objective places, and are input by the user. The guide route data MW are those of a route which is most desired, shortest or is recommended to arrive at the goal or the objective place. The genre code number JC is input through a processing for selecting the objective places that will be described later. The area designation data AS designate the area to be searched, and are input through the processing for selecting the objective places. The sub-reference data KS are for searching the objective places. The sub-reference data KS may often be stored in plural numbers.

The reference position data KP represent a reference position for searching the objective places. The data RD related to roads represent whether the road on which the car is running is an expressway or a highway. The running speed data V represent the running speed of the car. The data KA related to the area to be searched are coordinate data of the area of the objective place to be searched. The data KM related to the objective place to be searched are those of the objective place searched from the external data GD.

The data TK related to the distance to the objective place represent a distance to the objective place to be searched. The data UN related to the order of priority denote the order of priority given to the objective places to be searched. The data $\theta 2$ related to the angle of objective place represent the angle of the objective place to be searched relative to the absolute direction. The data $\theta$ related to the direction of objective place represent the angle of objective place to be searched relative to the direction of progress of the car. The keep the goal data MK are keeping data of the goal data TP, and are preserved prior to inputting the objective places.

The data (Xna, Yna) related to a coordinate difference represent a difference between the coordinates of the present position and the coordinates of the objective place. The data (Xka, Yka) related to a maximum coordinate difference represent a maximum value among the data related to coordinate differences. The distance data L is one of the data TK related to the distances to the objective places. In addition to the above, the RAM 4 stores the data for executing a variety of processings as well as data of variables (not shown).

5. Whole Processing

FIG. 5 is a flow chart illustrating the whole processing executed by the CPU 2. This processing starts upon making the power source circuit and terminates upon breaking the power source circuit. Upon starting the program, the CPU 2, RAM 4 and image processor 9, etc. are initialized. Then, a processing for obtaining the present position (step 50), a processing for setting the goal (step 51), a processing for searching the route (step 52) and a processing for indicating the guide (step 53) are executed repetitively.

In the processing for obtaining the present position (step 50), the present position of the car is calculated based upon the data sent from the present position detection device 20. In this processing (step 50), the latitude and longitude are calculated based on the data input from the GPS reception device 25. Based upon the latitude and longitude, the data (X, Y) related to the coordinates of longitude and latitude of the present position are formed. The data related to the coordinates of longitude and latitude are converted into orthogonal coordinate data (X0, Y0) of a coordinate system for each of the reduced scales. The data related to the coordinates of longitude and latitude and the data related to the orthogonal coordinates are stored in the RAM 4 as the data MP related to the present position. The data MP related to the present position are corrected by the data related to the present position from the beacon reception device 26 or the data transmission/reception device 27.

Operation is further carried out to discriminate the present position (position of the car) that has moved based upon the data ZD related to the absolute direction, data SD related to the relative direction and the data ML related to the distance of travel. The present position (position of the car) found through this operation is collated with the map data in the external data GD and is corrected; i.e., the present position is correctly indicted on the map picture. Owing to this processing, the present position of the car is correctly found even when GPS signals cannot be received as in running through a tunnel. The data ML related to the distance of travel is corrected by the acceleration data ma, therefore, error generated by for example slip of the tires is eliminated.

In the processing for setting the goal (step 51), the input image of the goal is shown on the display 33 upon manipulation by the user. The user designates any one of the address, phone number or name to thereby designate the goal. Moreover, when a genre is selected from a menu of genres related to sight-seeing resorts, facilities, etc., a list of a plurality of goals stored in the selected genre is shown on the display 33. Through another manipulation, furthermore, there are shown detailed contents of the goals. After the goal is selected, the operation is carried out to determine the goal, whereby the data related to the determined goal are stored in the RAM 4 as the goal data TP. A final goal and at least a passing place may be registered as goals. In the processing for setting the goal (step 51), further, a processing for setting the objective places (step 100) is executed.

The goals and objective places are set by touch operation using the touch panel 34 or by operating the switch 40 by hand, or are set by voice using the audio recognition unit 38. The operation switch 40 is provided with change-over switches 41 and 42. The manual operation and the voice operation are changed over by using the change-over switch 41. The operation for setting the goals and the operation for setting the objective places are changed over by the change-over switch 42. The processing for setting the goals (step 51) is jumped over when neither the operation for setting new goals nor the operation for setting new objective places is executed.

In the process for searching the route (step 52), a guide route is formed from the point of departure to the final goal or a guide route is formed from the present position to the objective place. The road number data of roads constituting the guide route are arranged in order, and the thus arranged road number data are stored in the RAM 4 as the guide route data MW. The processing for searching the route (step 52) is jumped over when there is no change in the guide route.

In the processing for indicating the guide (step 53), a guide route found by the processing for searching the route (step 52) is indicated by a thick red line on the map picture shown on the display 33. Then, the guide for driving the car along the guide route is produced in the form of voice from the speaker 13 or is indicated on the map picture. In the following embodiments, the map picture shown by the processing for indicating the guide (step 53) is automatically scrolled such that the present position is at the center of the picture at all times.

Through the repetition of the above-mentioned processings, the guide route to the goals or to the object places input by the user, the present position of the car and the running direction are indicated on the map picture shown on the display 33. The present position is corrected as the car continues to run. As the car approaches an intersection or a branching point, furthermore, the guide is offered in the form of voice or indication.

6. First Embodiment

In a first embodiment, the objective places are searched in compliance with a reference for search, and the order of priority is imparted to the object places that are searched. The first embodiment executes the following processing in the whole processing.

7. Processing for Setting Objective Places (First Embodiment)

FIG. 6 is a flow chart of the processing for setting the objective places (step 100) executed in the processing for setting the goals (step 51). As described earlier, the objective places are goals that were not scheduled before the departure but are places where the user may happen to drop in while running along the route to the final goal. Therefore, the objective places are set through another operation after the final goal and the passing places are set.

This processing is commenced when it is requested to execute the operation for setting the objective places by manipulating the change-over switch 42. The operation for setting the objective places is often carried out while driving the car. When it is instructed to start this processing, therefore, the voice operation mode is automatically set. When the change-over switch 41 is operated to request the manual operation mode, the operation for setting the objective places is carried out by manipulating the switch 40 by hand. This processing may be executed in response to an instruction by voice. This makes the operations of the change-over switches 41, 42 unnecessary.

The processing for setting the objective places (step 100) is repetitively executed together with the processing for obtaining the present position (step 50), processing for searching the route (step 52), and processing for indicating the guide (step 53). When the car has approached the intersection or the branching point while executing the operation for setting the objective places, the operation for setting the objective places is interrupted for several seconds. During this period, the guide related to the intersection or the like may be offered by voice and indication.

In the processing for setting the objective places (step 100), a processing for determining a reference for searching the objective places (step 102), a processing for determining a reference position in a range in which the objective places are searched (step 104), a processing for searching the objective places according to the reference for search (step 106), a processing for determining the order of priority for the objective places that are searched (step 108), a processing for indicating the objective places to which the order of priority is given (step 110), and a processing for storing an objective place selected by the user (step 112) are sequentially executed.

8. Processing for Determining Reference for Search (First Embodiment)

Figure 7:
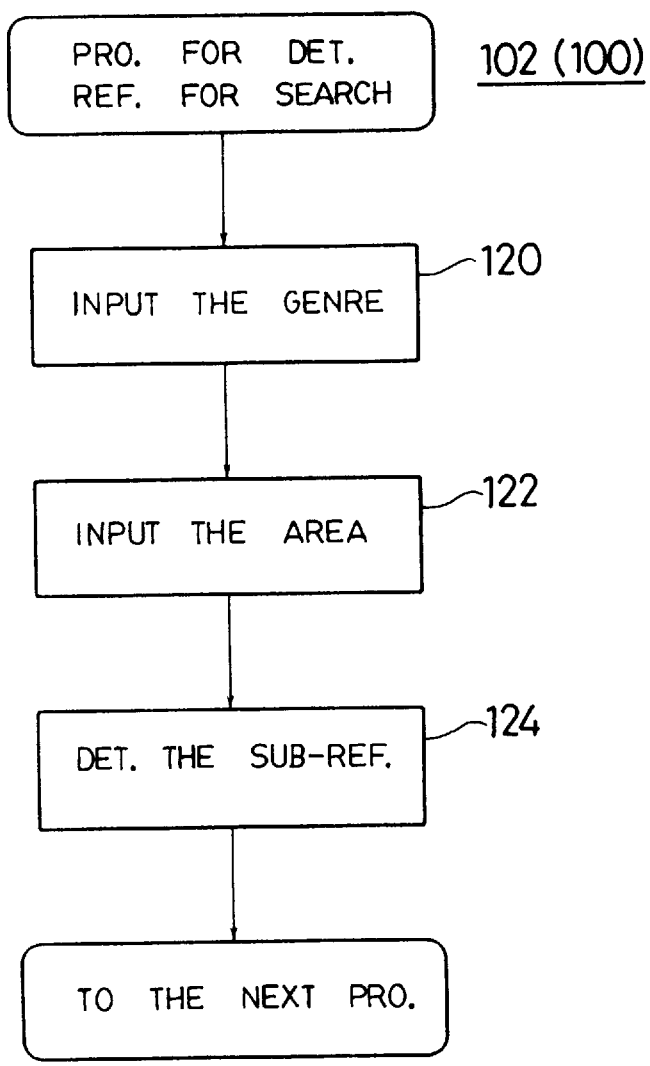
FIG. 7 is a flow chart illustrating the processing for determining a reference for search executed according to the first embodiment.

FIG. 7 is a flow chart illustrating the processing for determining the reference for search (step 102). In a processing for inputting the genre (step 120), an command signal is sent from the CPU 2 to the voice processor 11, and a inquiry is sounded from the speaker 13 saying, for example, "Which genre is it?". When a voice signal is input to the CPU 2 from the audio recognition unit 38 during a predetermined standby period, the voice data that are input are converted into code data. The code data are collated with the genre code number data JC in the objective place data file F16. The genre code number data JC in agreement with the voice that is input are stored in the RAM 4. When, for instance, the user pronounces "gas station", the genre code number data JC of a gas station is stored in the RAM 4.

When the voice operation is not carried out, the user manipulates the keys of the touch panel 34. Then, a menu of genres is shown on the display 33. The user then selects a genre out of the genres in the menu.

In a processing for inputting the area (step 122), a command signal is sent from the CPU 2 to the voice processor 11, and the voice is sounded from the speaker 13 saying, for example, "Designate the area to be searched, please". When a voice signal is input to the CPU 2 from the audio recognition unit 38 during a predetermined standby period, the voice data that are input are converted into data AS for designating the area, and then the data AS is stored in the RAM 4. It is also allowable to search the objective places from all of the data instead of designating the area. With the area being set first, however, the processing speed can be increased.

The area to be searched is designated by a reduced scale of the map, by a circular range or by a square range. When the area to be searched is to be designated by the reduced scale of the map, the predetermined words for selecting the reduced scales are used. When the user pronounces the words, the data of a corresponding reduced scale are stored in the RAM 4 as the data AS for designating the area. Or, the scale is decreased stepwise every time the user pronounces "wide", and is stepwisely increased every time when the user pronounces "details".

When the area to be searched is designated by a circular range or by a square range, the area is searched over a circular range or a square range with the reference position KP that will be described later as a center. In this case, the user inputs the numerical values by voice saying, for example, "a radius of 10 kilometers" or "a square of a side of 10 kilometers". Then, the data of the radius or the data of the length of the side input by voice are stored in the RAM 4 as the data AS for designating the area.

It is further allowable that the user inputs the name of a particular city, town or village by voice, so that the area of the city, town or village is searched. The reduced scales of the map may be in two kinds of "wide" and "details". In this case, a wide area of the map picture is searched when the user pronounces "wide". Then, the data designating the wide area are stored in the RAM 4 as the data AS for designating the area. When the user pronounces "details", the detailed area of the map picture is searched. Then, the data designating the detailed area are stored in the RAM 4 as the data AS for designating the area.

The above-mentioned genre of objective places and the area to be searched serve as a main reference for search. At a next step 124, a sub-reference specific to each genre of objective places is input. In this processing, a command signal is sent from the CPU 2 to the voice processor 11. Then, the speaker 13 generates the voice requesting a sub-reference that corresponds to the genre code number JC that is designated above. When the designated genre pertains to "gas stations", the voice is sounded saying, for example, "What is the name?" When the designated genre pertains to "restaurants", the voice is sounded saying, for example, "What kind of dish will you have?"

When a predetermined voice signal is input during a predetermined standby period, the voice data that are input are converted into sub-reference data KS by the CPU 2 and are stored in the RAM 4. When the sub-reference is not needed to be selected by the user, the CPU 2 automatically stores the sub-reference data KS that have been determined in advance in the RAM 4. When the genre pertains to parking zones, the sub-reference data KS representing "parking zones" are stored. The items of the sub-reference are the same as the items included in the objective place data MD stored in the objective place data file F16.

When the operation by voice is not carried out, the user manipulates the keys on the touch panel 34. Then, a menu of the areas to be searched is shown on the display 33. The user selects an area to be searched out of the menu. Then, a menu of sub-references is shown on the display 33. The user selects at least one sub-reference out of the menu.

9. Processing for Determining Reference Position (First Embodiment)

Figure 8:
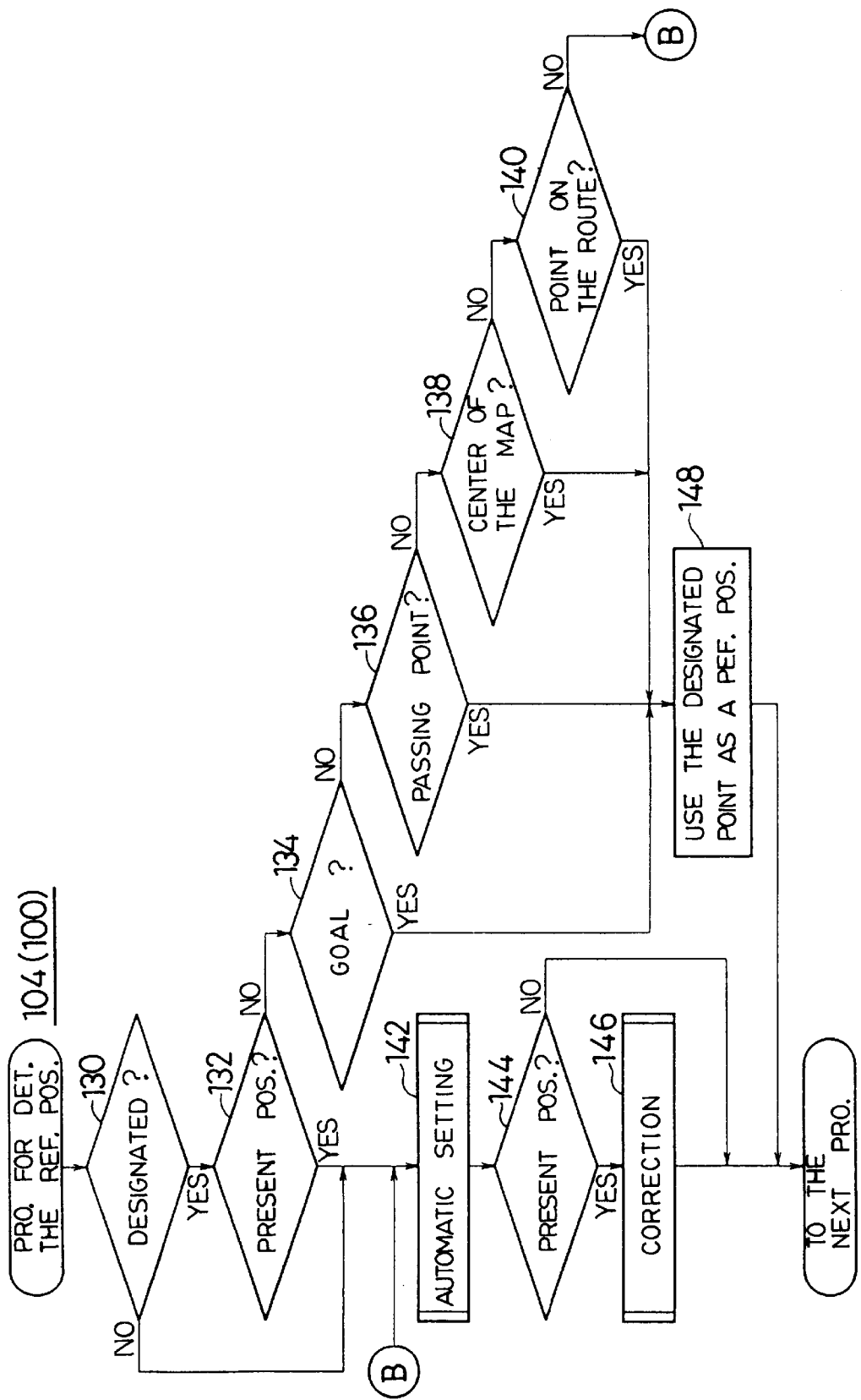
FIG. 8 is a flow chart illustrating the processing for determining a reference position executed according to the first embodiment.

FIG. 8 is a flow chart illustrating a processing for determining a reference position (step 104). First, a command signal is sent from the CPU 2 to the voice processor 11, and the speaker 13 sounds the voice saying, for example, "Designate a reference position, please". Then, the user inputs by voice a reference point before the predetermined standby period elapses. The reference position may be the present position, final goal, passing place, center of the map picture shown on the display 33, intersection on the guide route or a position of a building.

When the voice is input by the user, the CPU 2 analyzes the content of the voice input data. When the reference position is remote from the present position, the designated point is stored in the RAM 4 as the reference position data KP (step 148). For instance, when the final goal is the reference position (step 134), the goal data TP is read out and is stored as reference position data KP.

When a passing point or a point on the route is designated (steps 136, 140), the user inputs by voice the name of that point. Then, the CPU 2 searches a point of the same name as the one that is input by voice from the intersection data file F2 and the goal data file F6. The position data of the point that is found is stored as the reference position data KP. When the center of the map is designated (step 138), the position data of coordinates at the center of the map picture shown on the display 33 are stored as the reference position data KP. The points other than those mentioned above may be designated as reference positions.

When the present position is designated (step 132) or when no voice is input within the above-mentioned predetermined standby period (step 130), a processing of a step 142 is executed. In step 142, a reference position is automatically set based upon the data related to the roads. When the reference position that is automatically set is the present position (step 144), the reference position is corrected depending upon the running speed (step 146). The above-mentioned inputs may be introduced by using keys on the touch panel instead of using voice.

10. Processing for Automatic Setting (First Embodiment)

Figure 9:
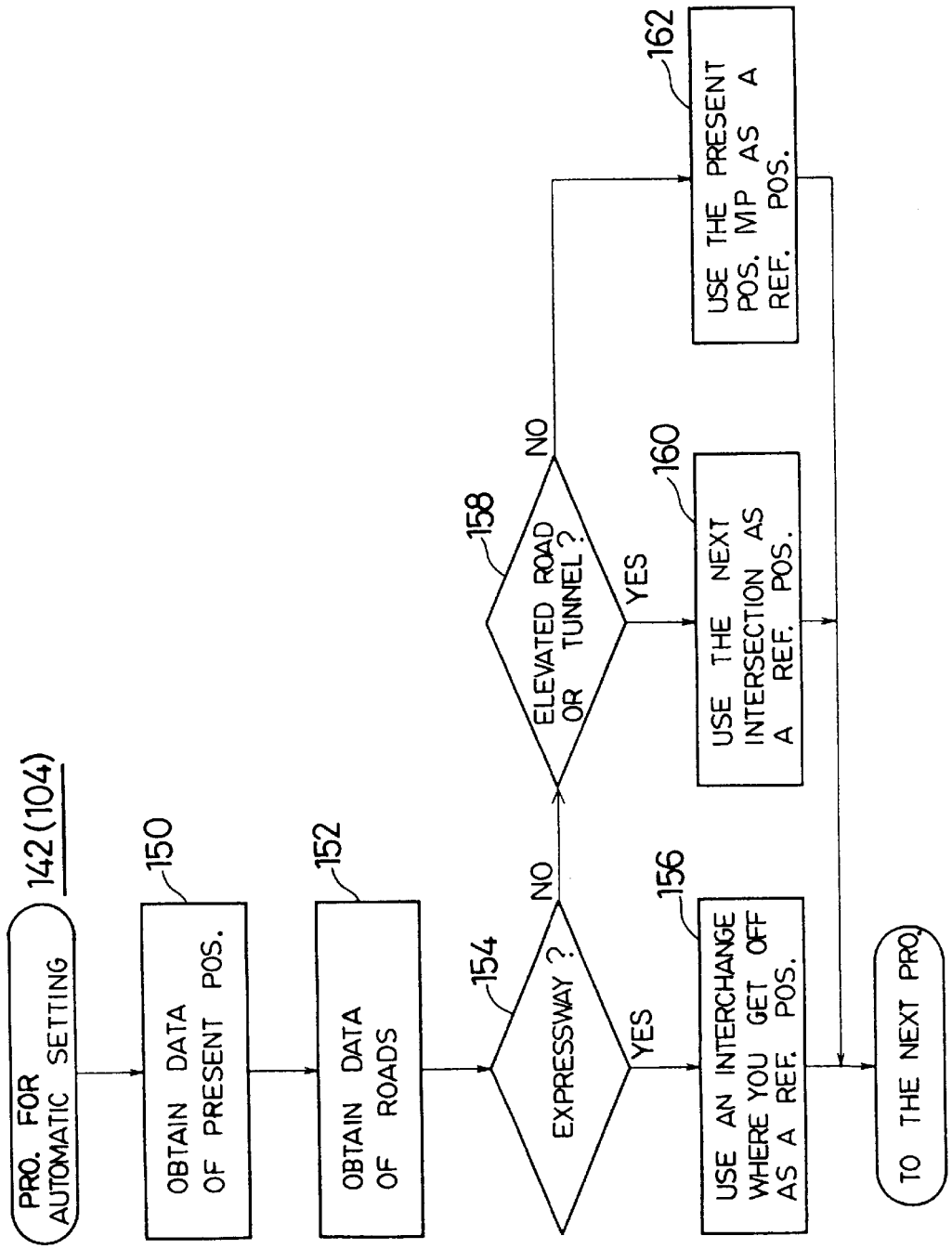
FIG. 9 is a flow chart illustrating the processing for automatic setting executed according to the first embodiment.

FIG. 9 is a flow chart illustrating a processing for automatically setting the reference position (step 142). First, the CPU 2 reads the data MP related to the present position from the RAM 4 (step 150). Based upon the data MP related to the present position, the road data file F4 is searched and the data related to the road on which the car is running is obtained (step 152). The data related to the roads may also be obtained from the data PI related to the present position stored in the RAM 4. The obtained data RD related to the roads are stored in the RAM 4. The data RD related to the roads is "01" when the road on which the car is running is an expressway, is "10" when the road on which the car is running is an elevated road or a tunnel, and is "00" when the road on which the car is running pertains to none of the above.

When the car is running on the expressway, for example, the user is not allowed to reach the objective places other than service areas unless he gets off to a highway. Therefore, when the present position is designated by the user as a reference position while the car is running on the expressway, a point at which the car gets off to a highway is set to be a reference position. In this case, an interchange at where the car is to get off is searched from the map data file F1, and the position of this interchange is stored in the RAM 4 as a reference position data KP (step 156).

When the road on which the car is running is an elevated road or a tunnel, the car is allowed to turn neither to the right nor to the left at the present position. Therefore, an intersection that appears first is searched from the intersection data file F2, and the position of this intersection is stored as a reference position data KP (step 160). When the car is running on a highway and this highway is neither an elevated road nor a tunnel, the present position data MP is regarded to be a reference position data KP. The present position data MP is corrected by a processing for correcting the reference position (step 146).

11. Processing for Correcting the Reference Position (First Embodiment)

Figure 10:
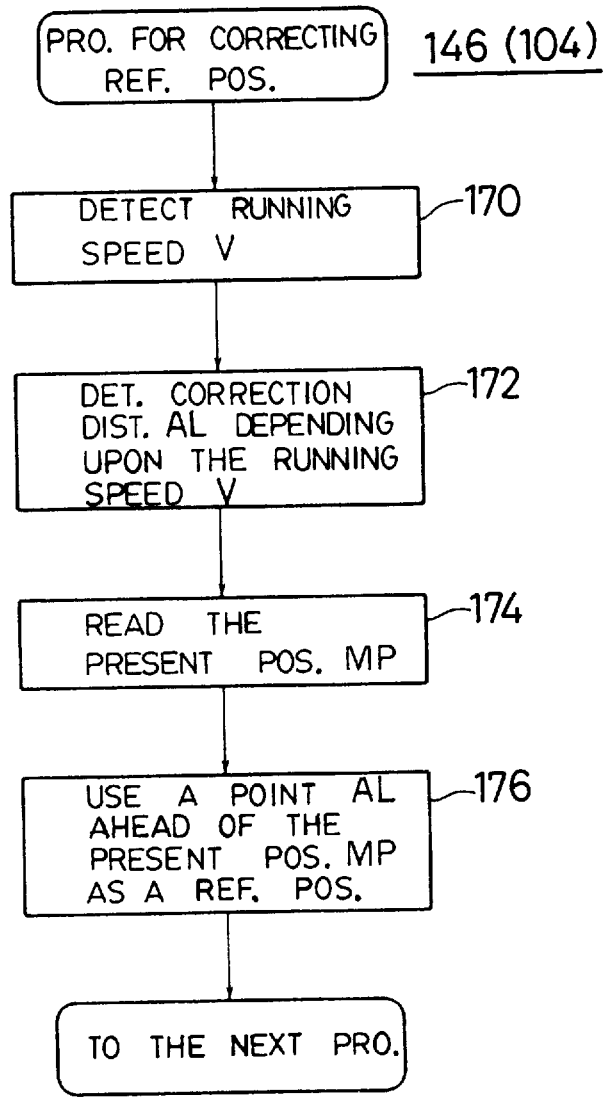
FIG. 10 is a flow chart illustrating the processing for correcting the reference position executed according to the first embodiment.

FIG. 10 is a flow chart illustrating the processing for correcting the reference position (step 146). It is not possible to suddenly turn the car to the right or to the left at the present position. When the present position is a reference position, therefore, the reference position is corrected to be ahead of the present position depending upon the running speed data V. The CPU 2 detects the running speed data V based upon the clock signals from the timekeeping device 6 and the data ML related to the traveled distance from the distance sensor 23 (step 170). The running speed may be obtained from the running speed data output from a speedometer (not shown).

The CPU 2 determines the correction distance data AL depending upon the running speed data V that is detected (step 172). The correction distance data AL is determined by executing a predetermined operation or by being read out from a memory table in which correction distance data AL corresponding to running speed data V are stored. The correction distance data AL increases with an increase in the running speed data V. Next, the CPU 2 reads the data MP related to the present position from the RAM 4 (step 174), and a position which is ahead of the present position by the correction distance data AL is regarded to be a reference position (step 176). The corrected position is stored in the RAM 4 as data KP related to the reference position.

12. Processing for Searching Objective Places (First Embodiment)

Figure 11:
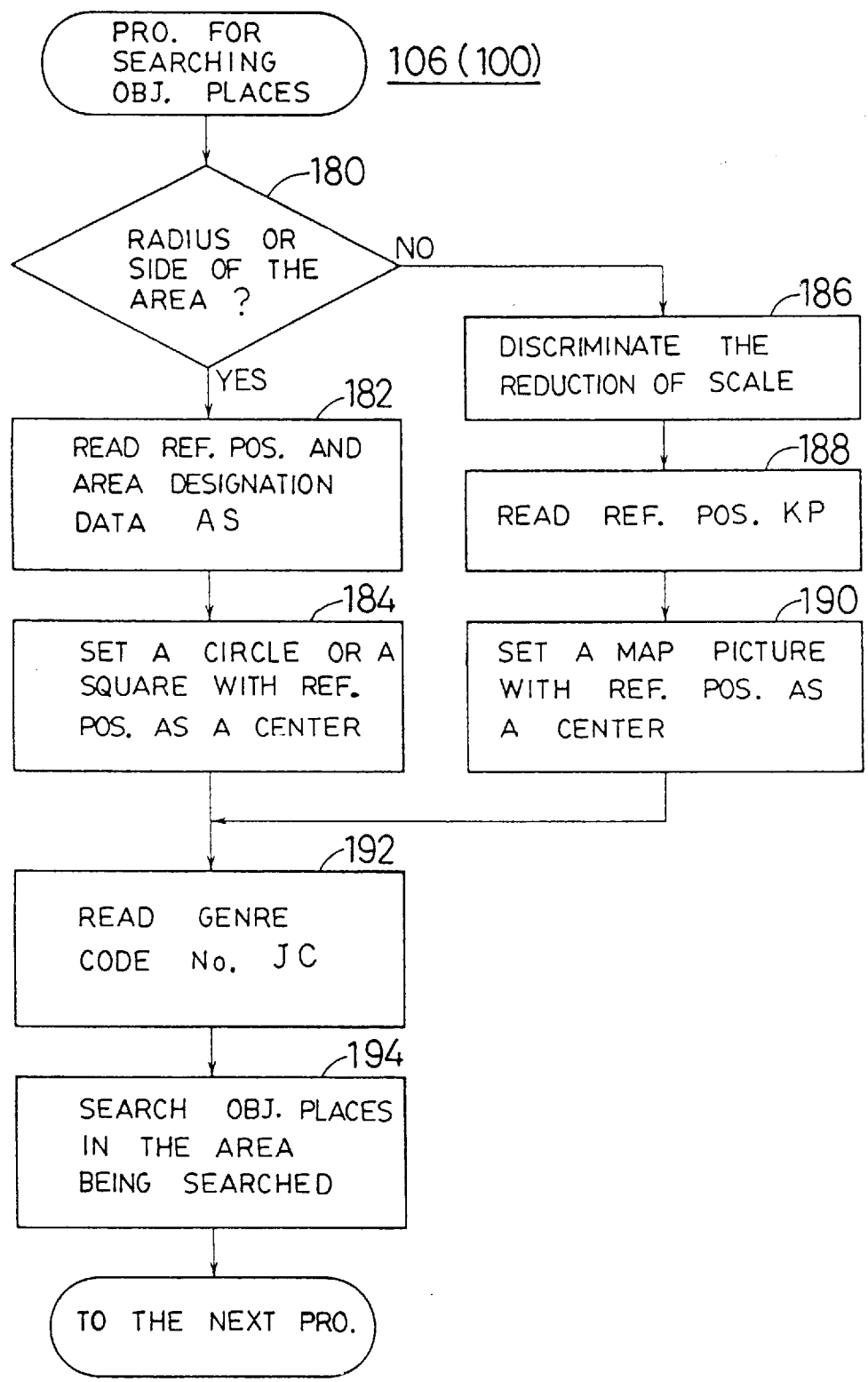
FIG. 11 is a flow chart illustrating the processing for searching objective places executed according to the first embodiment.

FIG. 11 is a flow chart of a processing for searching the objective places (step 106). When the radius or the length of the side of the area to be searched is designated by the user (step 180) in the processing for determining the reference for search (step 102), the CPU 2 reads the reference position data KP and the area designation data AS (step 182). Then, a circle of the radius input by the user or a square having a side of the length input by the user is set with the reference position as a center, and the area surrounded by the circle or the square is regarded to be a area to be searched (step 184). The area data KA to be searched is stored in the RAM 4 as the coordinate data of a circle or a square with the reference position KP as a center.

When a "wide", "details" or a reduced scale is designated by the user in the processing for determining the reference for search (step 102), the CPU 2 discriminates the content of the area designation data AS (step 186) and, then, reads the data KP related to the reference position (step 188). Then, the center of a map picture of the designated scale is brought into agreement with the reference position KP. The area of the map picture is stored in the RAM 4 as the area data KA to be searched (step 190).

When the area data KA to be searched is set, the CPU 2, then, reads the genre code number data JC (step 192). Then, objective place data of a genre in agreement with the genre code number data JC are read out from the objective place data file F16. The coordinate data in the objective place data that are read out are searched and, hence, the objective places are searched in the area KA to be searched (step 194). The name data MM of the searched objective places, phone number data MT, coordinate data MZ, and information data MD are read out and are stored in the RAM 4 as data KM related to objective places to be searched. Thus, the objective places are searched from the objective place data file F16. On the other hand, the final goal and the passing places are searched from the goal data file F6.

13. Processing for Determining the Order of Priority (First Embodiment)

Figure 12:
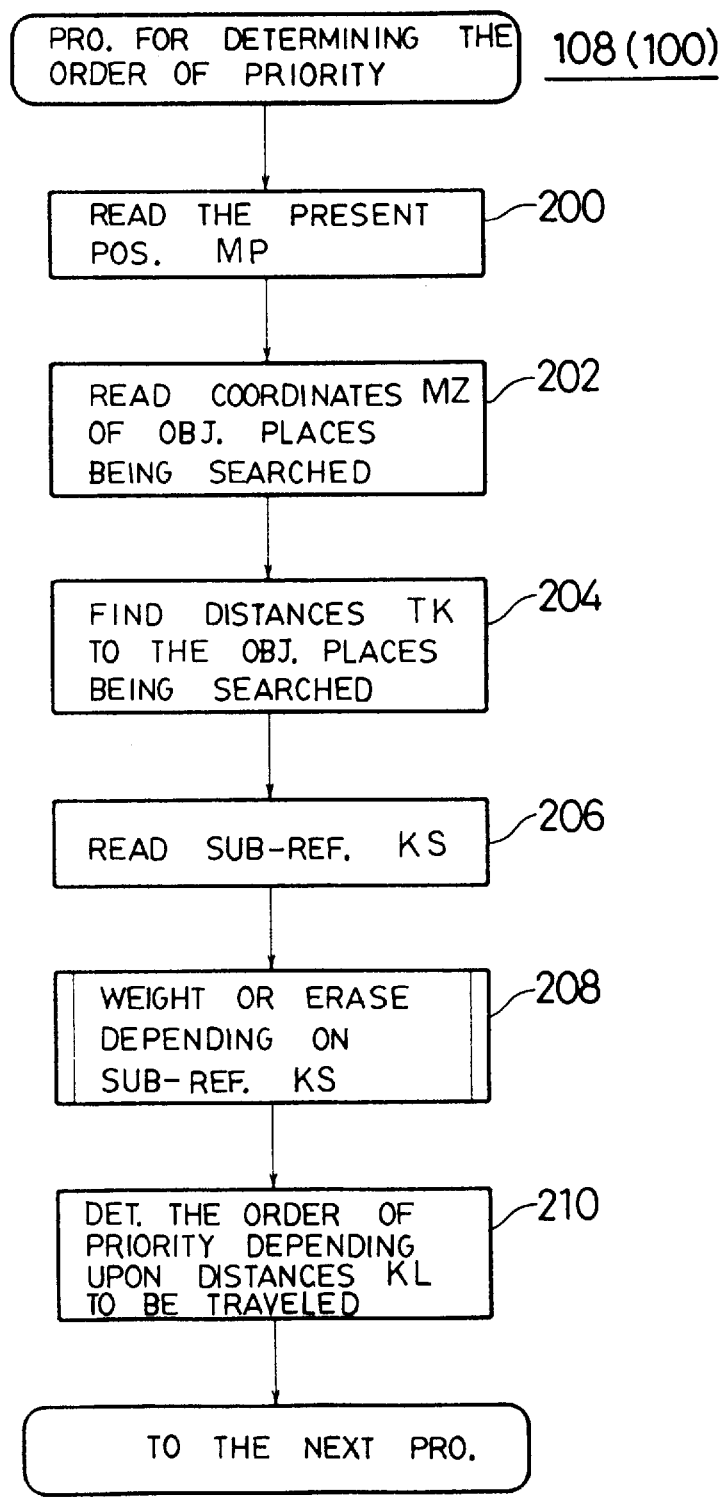
FIG. 12 is a flow chart illustrating the processing for determining the order of priority executed according to the first embodiment.

FIG. 12 is a flow chart illustrating a processing for determining the order of priority (step 108). First, the CPU 2 reads the data MP related to the present position (step 200). Furthermore, coordinate data MZ related to the objective places to be searched are read out from the data KM related to objective places to be searched (step 202). The distances are then calculated from the present position to the objective places to be searched (step 204). The distances found through this calculation are stored in the RAM 4 as data TK related to the distances to the objective places (step 204). The distances TK to the objective places are straight distances found according to the Pythagorean theorem or full lengths of the routes to the objective places being searched which are found from the map data file F1. The routes may be the shortest ones or those determined depending upon the data related to the roads.

Next, the CPU 2 reads the sub-reference data KS (step 206). The distances TK to the objective places are weighted or unnecessary data in the data KM related to the objective places to be searched are erased depending upon the sub-reference data KS (step 208). The order of priority is determined depending upon the weighted distances TK to the objective places or depending upon the data KM related to the remaining objective places to be searched (step 210). The data UN related to the order of priority are stored in the RAM 4.

14. Processing for Changing Distances to Objective Places (First Embodiment)

Figure 13:
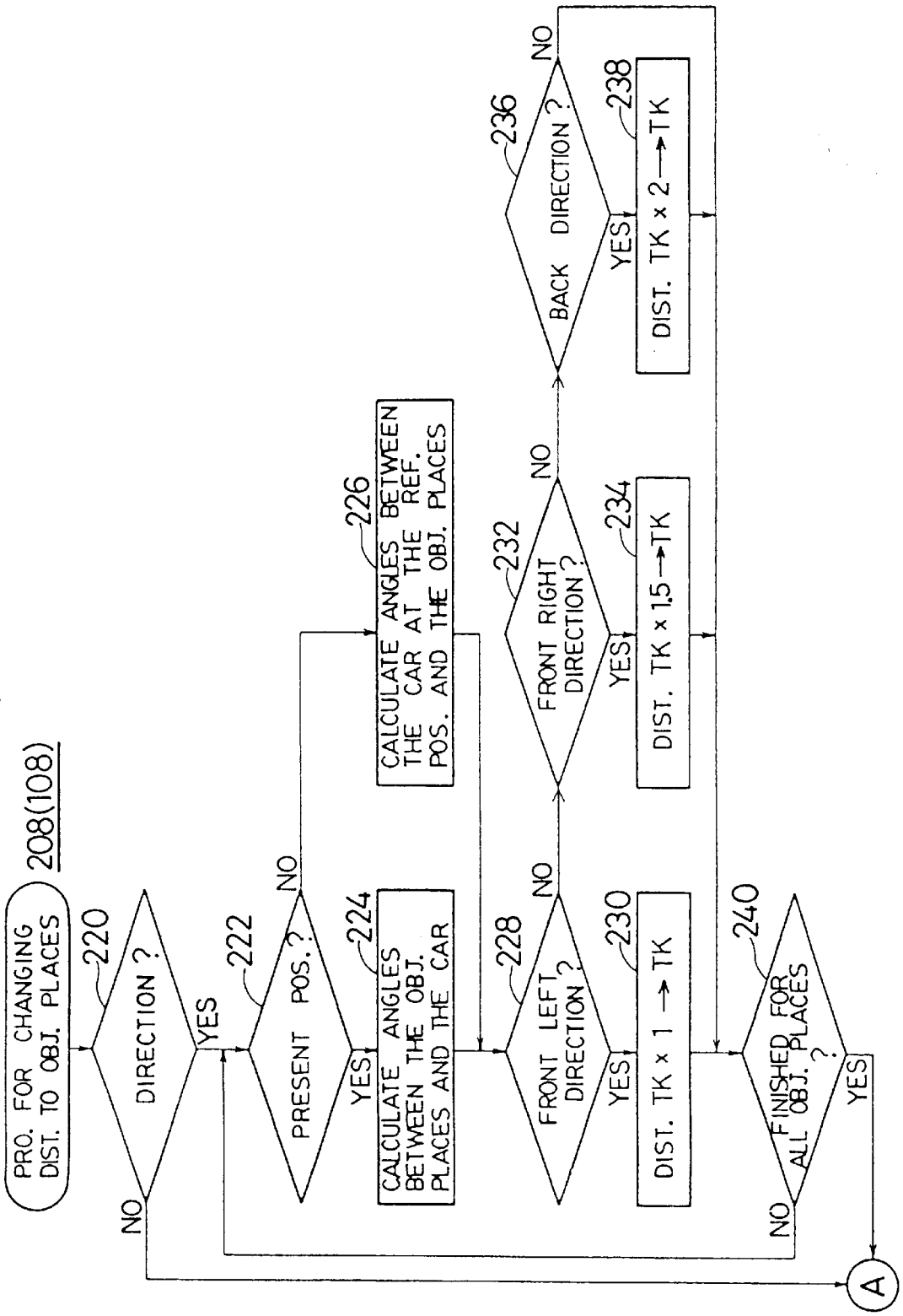
FIG. 13 shows a part of a flow chart illustrating the processing for changing the distance to the objective place executed according to the first embodiment.
Figure 14:
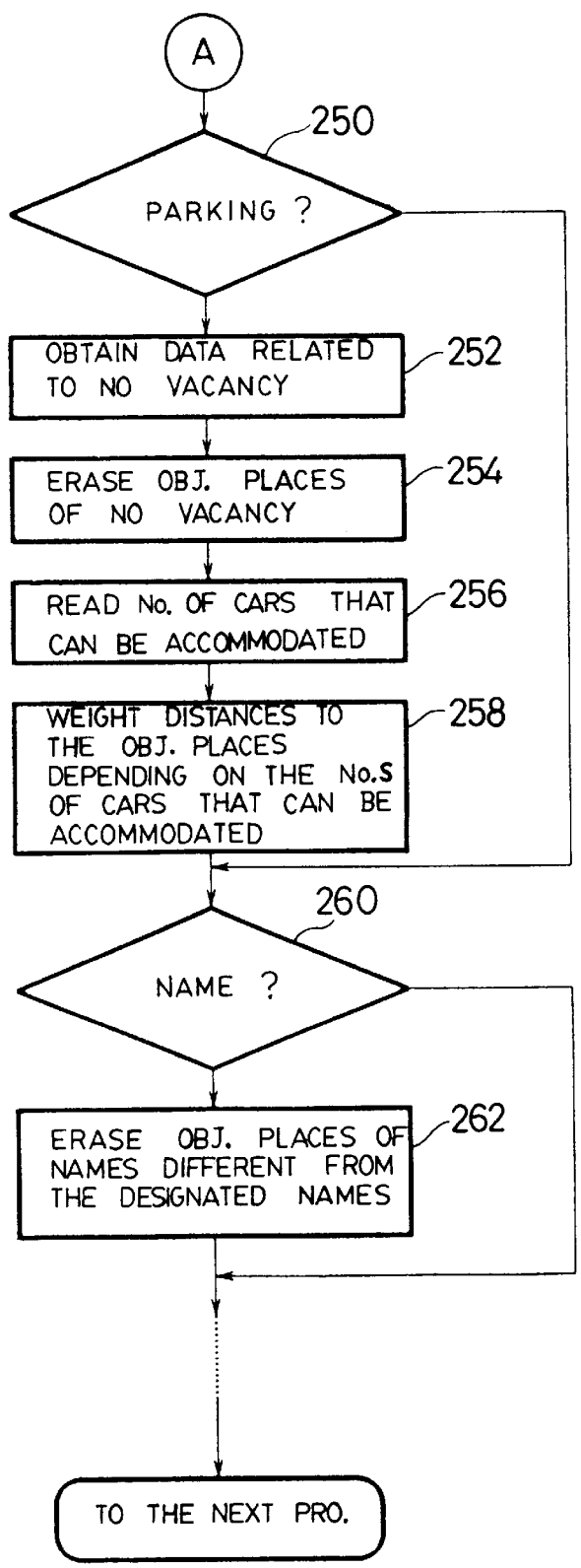
FIG. 14 shows the rest of the flow chart of FIG. 13 illustrating the processing for changing the distance to the objective place executed according to the first embodiment.

FIGS. 13 and 14 illustrate a flow chart of a processing for weighting the distances TK to the objective places and for erasing undesired data KM related to objective places to be searched (step 208). First, the CPU 2 discriminates the contents of sub-reference data KS (steps 220, 250, 260, - - - ).

When, for instance, the data indicating the "direction" are included in the sub-reference data KS, it is discriminated whether the reference position data KP represent the present position or not (step 222). When the reference position is the present position, angles are calculated between the direction of progress of the car and the objective places to be searched (step 224). These angles are stored in the RAM 4 as data $\theta$ related to the directions of objective places. The directions $\theta$ of objective places are calculated as described below. First, the CPU 2 reads the data $\theta1$ related to the angle of relative direction from the RAM 4.

The angle $\theta1$ of the relative direction is the one subtended by the direction of progress of the car with respect to the north direction, and is expressed by a value of 0 to 180 degrees in the counterclockwise direction from the north direction and by a value of 0 to −180 degrees in the clockwise direction from the north. The CPU 2 further reads the present position data MP and the coordinate data MZ related to objective places to be searched from the RAM 4. Then, $\tan\theta2$ is calculated from the coordinate data MZ and the present position data MP. From the $\tan\theta2$, the CPU 2 further calculates an angle $\theta2$ of relative direction of the objective place to be searched with respect to the north direction. The angle $\theta2$ of relative direction of the objective place to be searched is stored in the RAM 4 as data $\theta2$ related to angles of objective places.

The direction $\theta$ of the objective place is calculated according to $\theta=\theta2-\theta1$. The direction $\theta$ of the objective place is further calculated depending upon, when θ>180 degrees: θ=θ−360 degrees,
and
when θ<−180 degrees: θ=360 degrees+θ.

Due to this calculation, the direction of the car is discriminated with respect to the objective places to be searched. The direction is discriminated on the following basis:

Front left direction when $0 \leq \theta \leq 90$,
Front right direction when $-90 \leq \theta < 0$,
Back left direction when $90 < \theta \leq 180$, and
Back right direction when $-180 < \theta < -90$.

The result of discrimination is added as a flag to the data KM related to the objective places to be searched. When the direction of the objective place is, for instance, "front left direction", the flag is "01". When the direction of the objective place is "front right direction", the flag is "10". When the direction of the objective place is "back left direction" or "back right direction", the flag is "11".

Next, when the direction of the objective place is "front left direction", the distance TK to the objective place is multiplied by "1". The distance TK to the objective place that is multiplied is stored in the RAM 4 as a new distance TK to the objective place (step 230). When the direction of the objective place is "front right direction", the distance TK to the objective place is multiplied by "1.5". The distance TK to the objective place that is multiplied is stored in the RAM 4 as a new distance TK to the objective place (step 234). When the direction of the objective place is "back left direction" or "back right direction", the distance TK to the object place is multiplied by "2". The distance TK to the objective place that is multiplied is stored in the RAM 4 as a new distance TK to the objective place (step 238).

In a country where the rule is keep to the left, easiness to drive the car decreases in the order of toward the "front left direction", "front right direction" and "back direction". Therefore, the weighting is so effected that the distance to the objective place is shortened in a direction in which the car can be driven most easily. The above-mentioned calculation of direction and weighting (steps 222 to 238) are executed for all of the objective places KM to be searched (step 240).

When the reference position is not the present position, the reference position data KP are used instead of the present position to execute the above-mentioned processing. Thus, the direction of the objective place is found with respect to the car at the reference position. The distance TK to the objective place is weighted depending upon the direction of the objective place. The angle θ1 of direction of the car at the reference position is an angle of the direction of progress of a guide route at the reference position with respect to the north direction. This angle is calculated using the data in the road data file F3.

When the designated genre pertains to "parking", the data representing "parking" are included in the sub-reference data KS. When the sub-reference data KS read by the CPU 2 includes the data of "parking", the "data related to no vacancy" are read out as shown in FIG. 14 (step 252). The data related to no vacancy are picked up from the data related to the roads such as VICS data VD or the ATIS data AD, etc. The data related to no vacancy are added as a flag to the data KM related to objective places to be searched. The CPU 2 erases the data KM related to objective places to be searched to which is added the flag of "data of no vacancy". Thus, the parking zones without vacancy are excluded from the objective places.

Next, the data related to the number of cars that can be accommodated are read out from the data KM related to remaining objective places to be searched. The distances TK to the objective places to be searched are weighted depending upon the numbers of cars that can be accommodated. For instance, when the number of cars that can be accommodated is smaller than 50, the distance TK to the objective place is multiplied by "2". When the number of cars that can be accommodated is from 50 to 99, the distances TK to the objective places is multiplied by "1.5". When the number of cars that can be accommodated is not smaller than 100, the distances TK to the objective places is multiplied by "1". Thus, the weighting is effected in a manner that the larger the number of cars that can be accommodated, the smaller the distances TK to the objective places.

When the designated genre pertains to "gas stations", "convenience stores" and the like, the sub-reference data KS includes the "name" data related to the supplier companies, chain stores, etc. In this case, the CPU 2 discriminates whether the name codes in the data KM related to the remaining objective places to be searched are in agreement with the name codes of the sub-reference KS. The data KM related to objective places of names different from the names of the sub-reference KS are erased (step 262). Thus, the objective places of names other than those designated by the user are excluded.

Though neither diagrammed nor described, the sub-references KS may further include, for example, "upper limits and lower limits" such as of direction, distance, fees, etc., "designated ranges" such as urban areas, rural areas, numbers of cars that can be accommodated, business times, etc., "selective designations" of specific objective places, "exceptional designations" of specific objective places, "fees", "positions" such as near a pond, close to a port, etc., "altitudes" such as on the mountains or on the rooftop, "depths" such as under the sea level or under the ground, "size", "attribute", "features", "contents", "natures", etc. The distances TK to the objective places are weighted and undesired data KM related to objective places to be searched are erased depending upon these sub-references KS.

In addition to the above-mentioned information data related to the roads, the distances TK to the objective places are weighted or undesired data KM related to the objective places to be searched are erased based upon information of the routes to the objective places such as information of the area where objective places exist, construction that is taking place, controlled traffic, steep slopes, etc.

15. Processing for Determining the Order of Priority (First Embodiment)

Figure 15:
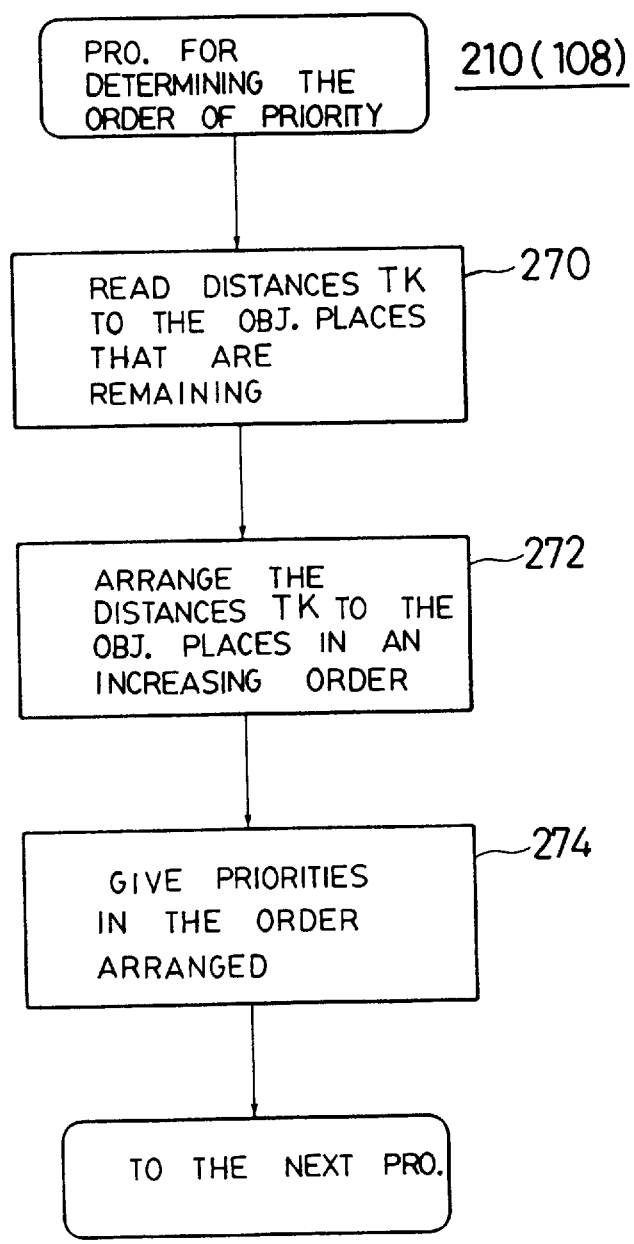
FIG. 15 is a flow chart illustrating the processing for determining the order of priority executed according to the first embodiment.

FIG. 15 is a flow chart illustrating a processing for determining the order of priority (step 210). First, the CPU 2 reads the data KM related to the remaining objective places to be searched, and reads the data TK related to the distances to the remaining objective places KM to be searched (step 270). The data TK related to the distances to the objective places that are read out are arranged in an increasing order (step 272). The order of priority is determined in the order of increasing distances TK to the objective places (step 274). The data UN related to the order of priority are stored in the RAM 4 corresponding to the data KM related to the objective places to be searched.

16. Processing for Indicating Objective Places (First Embodiment)

Figure 16:
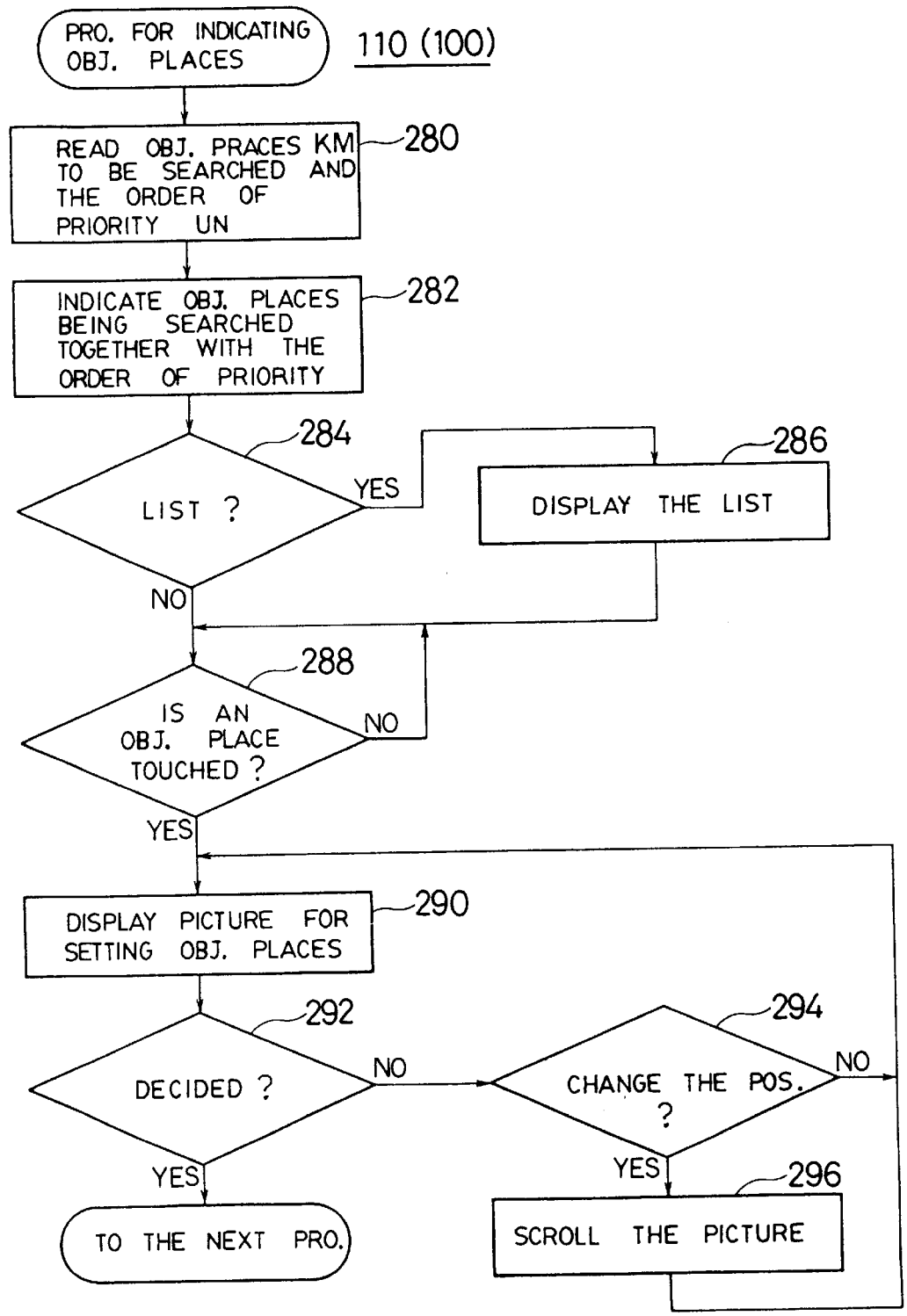
FIG. 16 is a flow chart illustrating the processing for indicating the objective place executed according to the first embodiment.

FIG. 16 is a flow chart illustrating the processing for indicating objective places (step 110). First, the CPU 2 reads the data KM related to the remaining objective places to be searched and the data UN related to the order of priority (step 280). A command is sent from the CPU 2 to the image processor 9, and the image data of a map with the reference position KP as a center are read out from the image memory 10. The map picture has a reduced scale as designated by the user.

To the image data that are read out are added marks of objective places to be searched, their names and the order of priority. The image data are sent to the display 33, and a map picture is shown (step 282). As shown in, for example, FIG. 17, the names of objective places and numerals 63 to 65 representing the order of priority are indicated on the map picture together with marks 60 to 62 of objective places. In an example shown in FIG. 17, the names and the order of priority are given to only those objective places of which the orders of priority are from first to third places.

Figures 17, 18:
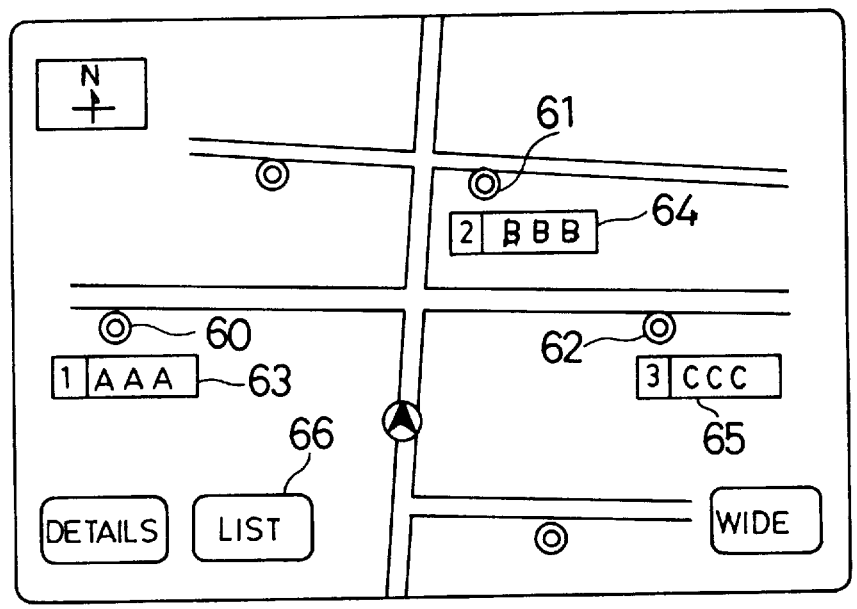
FIG. 17 illustrates a picture of display 33 indicating objective places.
FIG. 18 illustrates a picture of display 33 showing a list of objective places.

When a character "LIST" on the picture is touched by a finger by the user, as shown in FIG. 18, the display 33 shows a list of contents such as names, phone numbers, ranks of the shops, etc. of objective places KM to be searched together with the order of priority (steps 284, 286). When the characters "RETURN" 67 on the picture is touched by the finger, the map picture of FIG. 17 is shown. This list can be printed by using a printer 35.

Figure 19:
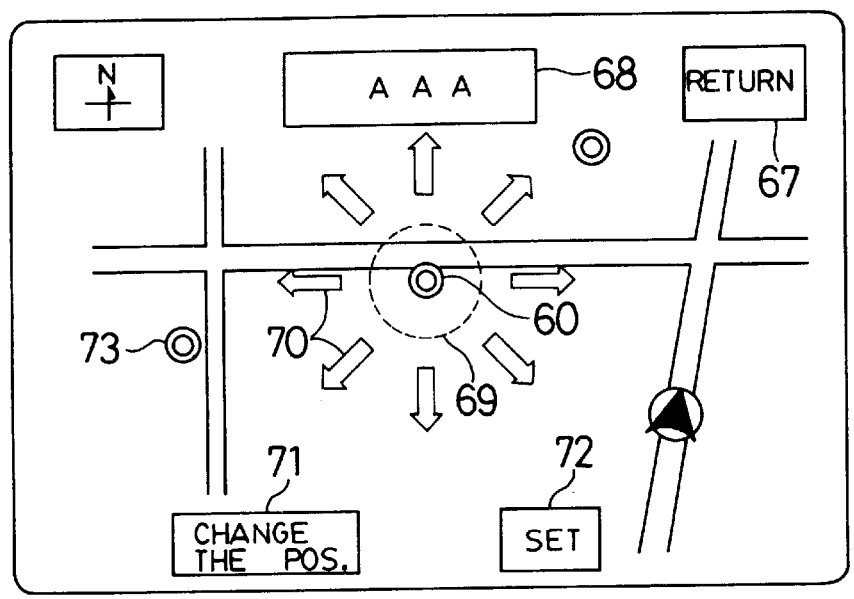
FIG. 19 illustrates a picture of setting the objective places indicated on the display 33.

The user selects one of the objective places and touches by finger any one of the objective place marks 60 to 62 in FIG. 17, the order of priority of FIG. 18 (numeral at the left end) or the name (step 288). Then, the position of the selected objective place comes to the center of the picture (step 290). The map picture is hereinafter referred to as a picture for setting objective places. If, for example, "AAA" is selected in FIG. 17 or 18, a mark 60 of "AAA" is moved to the center of the picture as shown in FIG. 19, and the name 68 is indicated at an upper portion of the picture. When the character "RETURN" 67 is touched, the picture of FIG. 17 is shown. When the character "SET" 72 is touched (step 292), the place "AAA" is stored in the RAM 4 as the objective place (step 112 of FIG. 6).

When the character "CHANGE THE POSITION" 71 is touched (step 294), a cursor 69 and arrows 70 are indicated on the display 33 as shown in FIG. 19 (step 296). The cursor 69 is a small circle surrounding the center of the picture, and the arrows 70 are arranged to indicate eight directions surrounding the cursor 69. On this picture, the objective place indicated at the center of the picture can be changed into a different objective place. When the user touches any arrow 70, the picture is scrolled in the direction of the arrow 70 that is touched (step 296).

Figure 20:
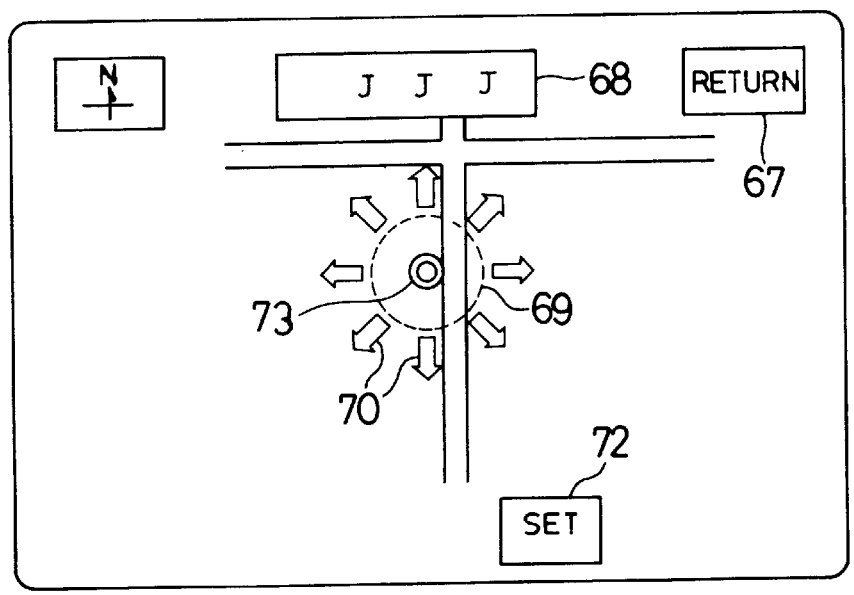
FIG. 20 illustrates a picture of display 33 of when the objective place is changed.

The user scrolls the screen and brings the mark of any desired objective place into the cursor 69. For instance, when the user wishes a mark 73 in FIG. 19, the picture is scrolled by the user as shown in FIG. 20, and the user brings the mark 73 into the cursor 69. A new objective place is not limited by the genre designated by the user but can be freely selected from the points shown on the display 33.

When any arrow 70 is not touched within a standby period, the arrows 70 are erased. Then, the picture for setting objective places indicates the character "CHANGE THE POSITION" 71 and the character "SET" 72. When the character "&CHANGE THE POSITION" 72 on the picture is touched, the arrows 70 are indicated again, so that the picture can be scrolled (step 292).

17. Processing for Storing Objective Places (First Embodiment)

Figure 21:
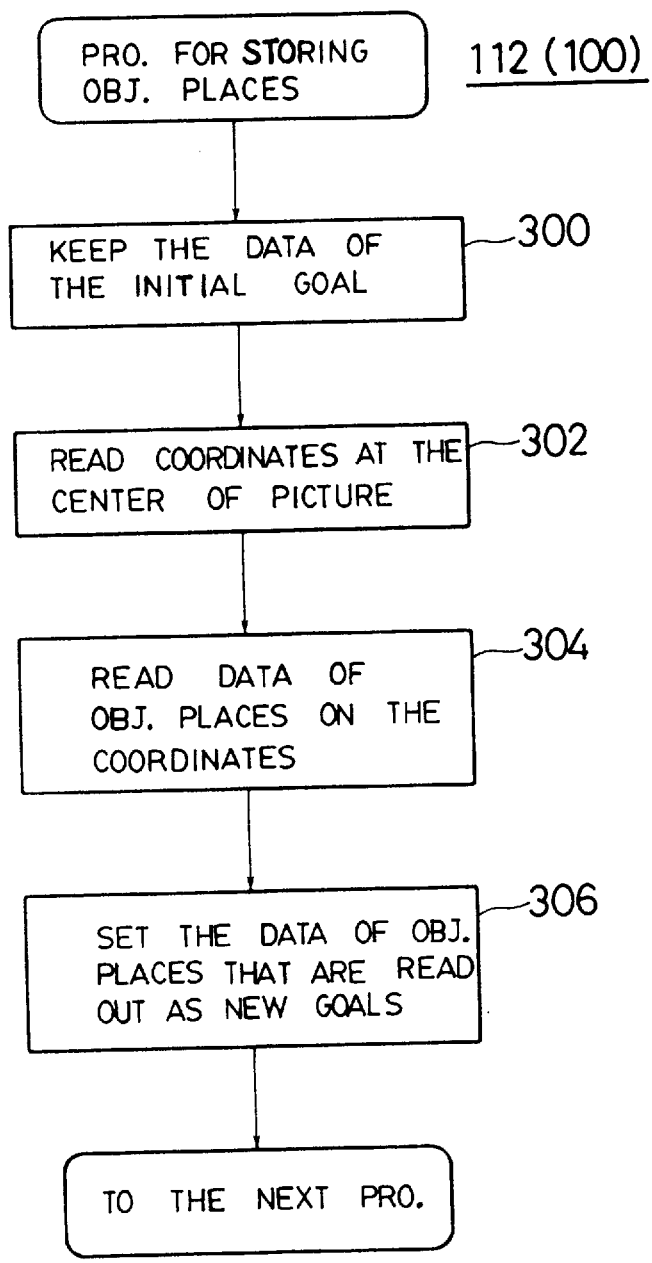
FIG. 21 is a flow chart illustrating the processing for storing objective places executed according to the first embodiment.

FIG. 21 is a flow chart illustrating a processing for storing objective places (step 112). When the character "SET" 72 is touched on the picture for setting objective places, the CPU 2 transfers the initial goal data TP set by the processing for setting the goals to a keeping area MK in the RAM 4 (step 300). Thus, the data related to the initial goal are preserved.

The initial goal data TP are those of the final goal and passing places, and have been set by the processing for setting the goal (step 51 of FIG. 5) before the departure.

Next, the CPU 2 reads the coordinate at the center of the picture (step 302). The data related to objective place on the coordinate is searched from the objective place data file F16 (step 304). The data of objective place is stored in the RAM 4 as new goal data TP (step 306). Thus, the objective place turns into the new goal. The center of the picture on the display 33 is returned back to the present position. Then, the processing for searching the route to the objective places (step 52) and the processing for indicating the guide (step 53) are executed. Thus, the guide route is indicated to the objective places, and the navigation to the objective place that is designated by a system user is carried out. As the car arrives at the objective place, the initial goal data that had been kept are returned back again to the goal data TP. Thus, the navigation to the initial goal is carried out again.

The initial goal data that had been kept may be set to the goal data TP when the operation is executed by the user to restore the goal. Furthermore, the objective places may be set as passing places on the way to the initial goal, and the route to the initial goal via these objective places may be used as a new guide route.

According to the navigation device of this embodiment as described above, the objective places can be selected through a simple operation when the user suddenly wishes to drop in to a place on the way to the initially set goal. When a plurality of objective places are selected, furthermore, the objective places that conform to the desire of the user are automatically determined in the order of priority based upon the references designated by the user or upon the references that are automatically set. The order of priority is indicated in a form that can be easily discerned by the user. Therefore, the user is allowed to determine the objective places within short periods of time.

The data related to the reference positions or to the reference for search are input through an input means such as voice, touch panel or switches. Therefore, the objective places conforming to the desire of the user can be limited depending upon the positions or the contents. It is further possible to execute the operation by the voice input. Therefore, it is possible to execute the operation while driving the car.

The reference position is changed depending upon the running condition of the car (steps 104, 142, 146). For example, when the car is running fast, the reference position is set to be well ahead. When the car is running on an expressway, an interchange where the car is going to get off serves as the reference position. Moreover, the reference position is set at the present position or at a position remote from the present position (step 104), so that objective places at positions conforming to the desire of the user can be searched.

Further, the reference for search is not fixed. Therefore, it is possible to change the reference for search depending upon the genre of objective places. Depending upon the desire of the user, furthermore, the reference for search can be changed (step 102). Thus, the data of objective places that conform to the desire of the user are offered. The order of priority is determined depending upon the geographical data of the objective places and the data related to the contents of the objective places.

Moreover, the objective place data file F16 stores data of a variety of items. Thus, a variety of references for search are set depending upon a wide variety of demand of the user. Moreover, external data such as VICS or ATIS are received, and the order of priority of objective places is determined based upon the external data (steps 208, 252). Accordingly, the data related to no vacancy of the parking zone, traffic jam of the roads, etc. can be received on time.

18. Second Embodiment

According to the second embodiment, the objective places are searched depending upon the reference for search. Then, the reduced scale of the map is automatically adjusted when the searched objective places are indicated on the display 33. In the second embodiment, the following processings are carried out in the aforementioned whole processing.

19. Processing for Setting Objective Places (Second Embodiment)

FIG. 22 is a flow chart of a processing for setting objective places (step 400) executed in the processing for setting the goals (step 51). After the final goal and passing places are set, the objective places are set by another operation.

This processing starts when the operation for setting the objective places is requested by the operation of the change-over switch 42. Moreover, the operation for setting the objective places is often carried out while driving the car. When an instruction is issued to start this processing, therefore, the voice operation mode is automatically set. When the change-over switch 41 is operated to request the manual operation mode, the operation for setting the objective places is manually carried out by using the operation switch 40. This processing may be executed in response to an instruction by voice. This eliminates the need to operate the change-over switches 41, 42.

The processing for setting objective places (step 400) is repetitively executed together with the processing for obtaining the present position (step 50), processing for searching the route (step 52) and processing for indicating the guide (step 53). When the car has approached an intersection or a branching point while the operation is being carried out to set the objective places, the operation for setting the objective places is interrupted for several seconds. During this period, the intersection or the like may be guided by voice and indication.

In the processing for setting the objective places (step 400), a processing for determining a reference for searching objective places (step 402), a processing for searching the objective places depending upon the reference for search (step 404), a processing for indicating the objective places that are searched (step 406), and a processing for storing one of the objective places selected by the user (step 408) are successively executed.

20. Processing for Determining Reference for Search (Second Embodiment)

Figure 23:
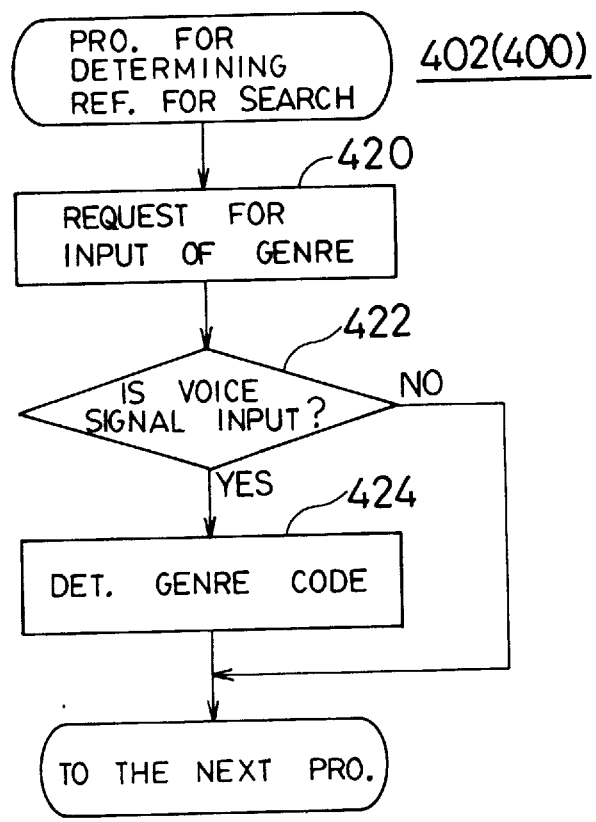
FIG. 23 is a flow chart illustrating the processing for determining a reference for search executed according to the second embodiment.

FIG. 23 is a flow chart of a processing for determining reference for search (step 402). At a step 420, an command signal is sent to the voice processor 11 from the CPU 2, and the speaker 13 sounds an inquiry saying, for example, "Which genre is it ?" The genre defines a range of content and serves as a first reference for search.

At a next step 422, it is discriminated whether a voice signal is input to the audio recognition unit 38 from the CPU 2 or not during a predetermined standby period. The voice signal that is input is converted into code data. The code data is collated with the genre code numbers JC in the objective place data file F16 (step 424). The genre code number data JC in agreement with the voice input are stored in the RAM 4. When the user pronounces, for example, "gas station", the genre code number data JC of gas stations is stored in the RAM 4.

When the operation by voice is not carried out, the user operates keys on the touch panel 34, so that a genre menu is indicated on the display 33. The user then selects a genre out of the genre menu.

21. Processing for Searching Objective Places (Second Embodiment)

Figure 24:
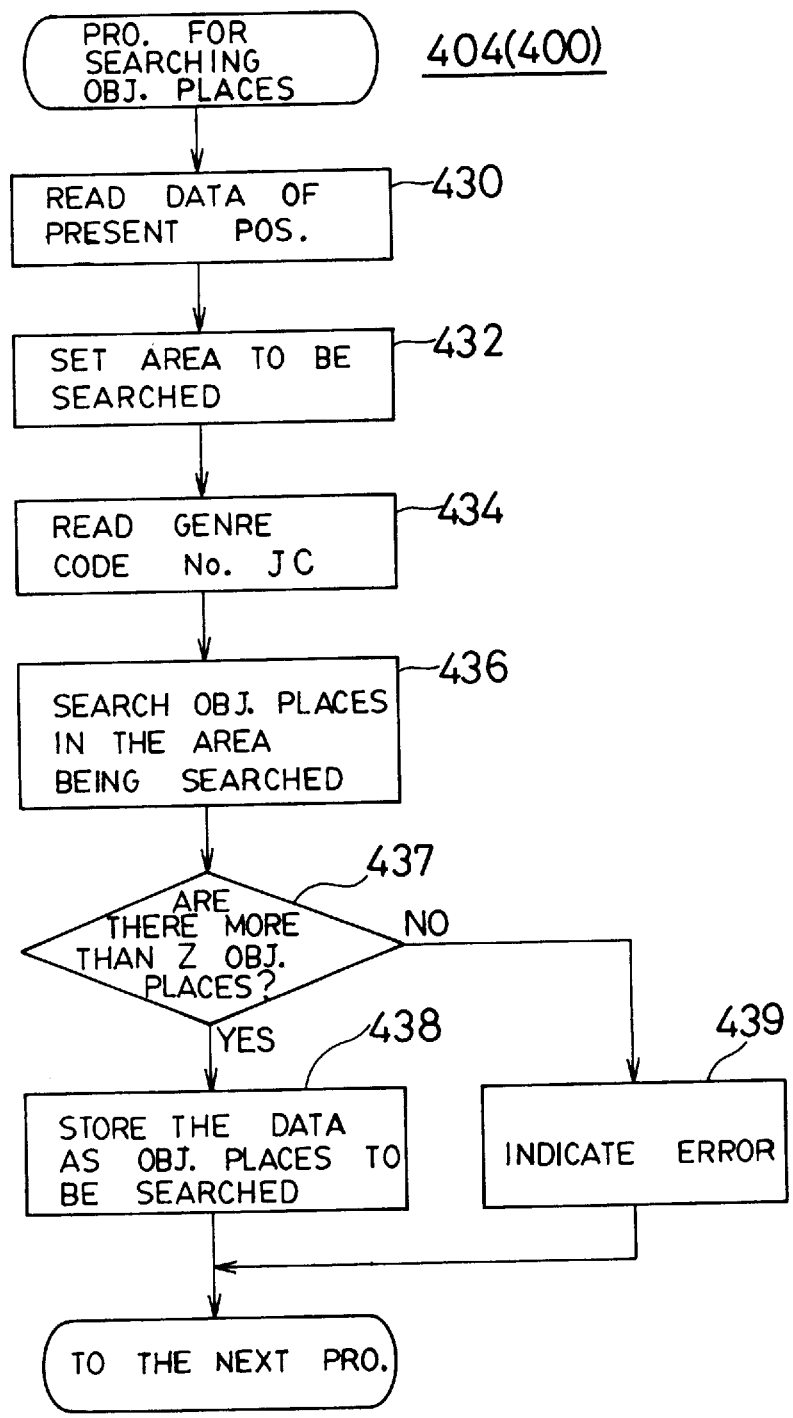
FIG. 24 is a flow chart illustrating the processing for searching objective places executed according to the second embodiment.

FIG. 24 is a flow chart of the processing for searching objective places (step 404). First, the CPU 2 reads the data MP related to the present position (step 430). The area to be searched is then set (step 432). The center of the area to be searched is the present position. The area to be searched defines a geographical range and serves as a second reference for search. The area to be searched is a range of predetermined coordinates of longitude and latitude. For instance, the present position is at the center in a square range having a side of a predetermined distance 2$a$. When the coordinates of longitude and latitude of the present position are (X, Y), the area to be searched covers a range of from X−a to X+a and from Y−a to Y+a. The distance 2$a$ has been determined in advance. Therefore, the range of the area to be searched is equal to, or slightly narrower than, the range of the picture when a map having the smallest scale of 1 to 640,000 is shown on the display 33. The coordinates of the area to be searched are stored in the RAM 4 as area data KA to be searched.

Next, the genre code number data JC is read (step 434). Then, the data of objective places of a genre in agreement with the genre code number JC are read from the objective place data file F16. It is then discriminated whether the coordinate data MZ in the data of objective places that are read out lie within the above-mentioned area KA to be searched or not (step 436). When the coordinates of longitude and latitude of objective places are ($X_p$, $Y_p$), it is discriminated at the step 436 whether there hold relations X−a<$X_p$<X+a and Y−a<$Y_p$<Y+a. The objective places present along the guide route are not only searched but also the objective places at points other than along the guide route are searched.

It is then discriminated whether a number of the objective places that are searched is larger than a predetermined number Z or not (step 437). When the number of the objective places is larger than the predetermined number Z, the name data MM of objective places in the area to be searched, phone number data MT of them, coordinate data MZ of them, and information data MD of them are read out and are stored in the RAM 4 as data KM related to the objective places to be searched (step 438). Symbol n represents a number of objective places in the area to be searched. When the number of objective places in the area to be searched is smaller than the predetermined number Z, this fact is informed by error indication and voice (step 439). In this case, the area KA to be searched may be expanded, and then the objective places are searched again from the expanded area KA. The area KA to be searched is stepwise expanded until the number of objective places in the area KA to be searched becomes greater than the predetermined number Z.

22. Processing for Indicating Objective Places (Second Embodiment)

Figure 25:
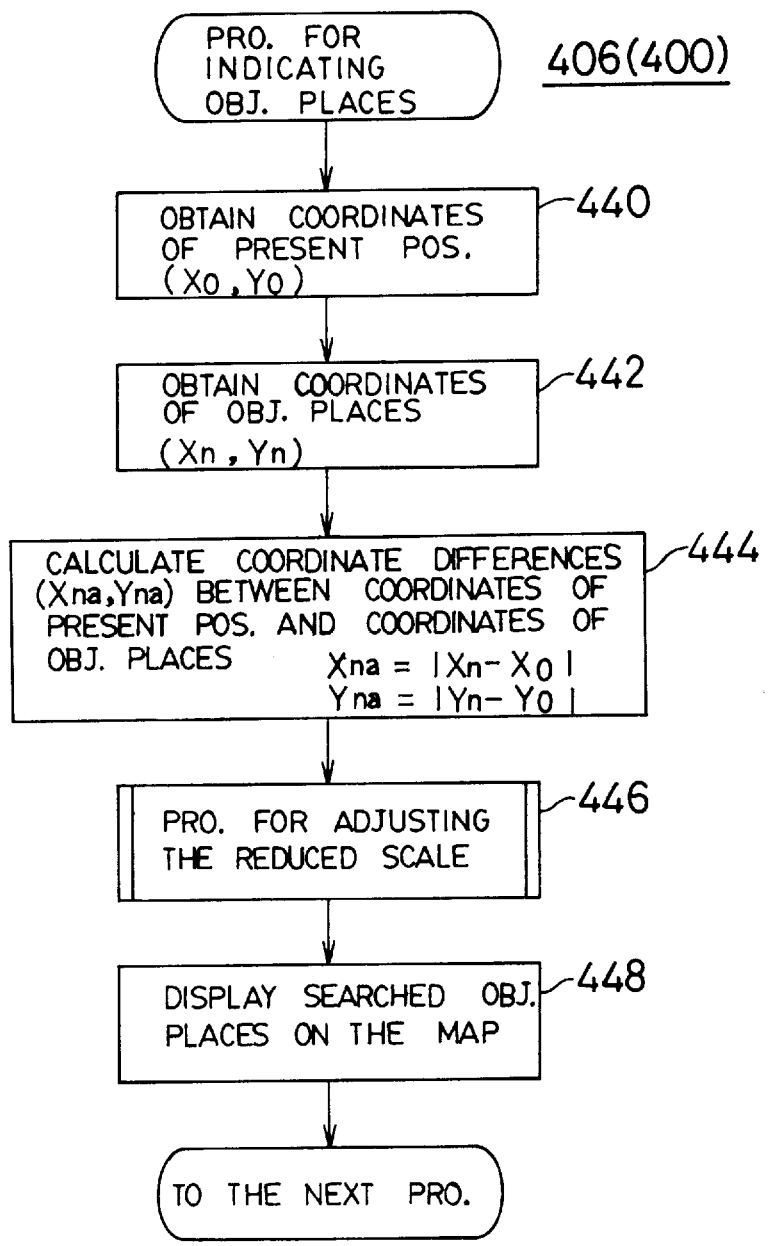
FIG. 25 is a flow chart illustrating the processing for indicating objective places executed according to the second embodiment.

FIG. 25 is a flow chart of the processing for indicating the objective places (step 406). First, the CPU 2 reads the data MP related to the present position from the RAM 4 or the image memory 10 (step 440). The data MP related to the present position are coordinates ($X_0$, $Y_0$) of the present position in the map picture shown on the display 33 when this processing (step 406) is started. Next, the coordinate data ($X_n$, $Y_n$) corresponding to the scale of the map are read out (step 442) from the coordinate data of n object places KM to be searched stored in the RAM 4 at the above-mentioned step 438.

The coordinate data are those of coordinates on the scale of map shown on the display 33 when the processing (step 406) is started. Coordinate differences (Xna, Yna) are then calculated between the coordinates (X0, Y0) of the present position and the coordinates (Xn, Yn) of the objective places (step 444). This calculation complies with Xna=|Xn−X0|, Yna=|Yn−Y0|, and is executed for all coordinates (X1, Y1), - - - , (Xn, Yn) of n objective places to be searched. The coordinate differences vary in proportion to straight distances between the present position and the objective places to be searched. The data of coordinate differences (Xna, Yna) are stored in the RAM 4.

Next, a processing (step 446) for adjusting the reduced scale adjusts the scale of the map picture on which the objective places to be searched are indicated based on the coordinate differences (Xna, Yna). For example, a reduced scale is selected for indicating the predetermined number Z of objective places to be searched in the order of increasing distance from the present position. Then, marks, figures or characters representing the objective places to be searched are indicated on the display 33.

23. Processing for Adjusting the Reduced Scale (Second Embodiment)

Figure 26:
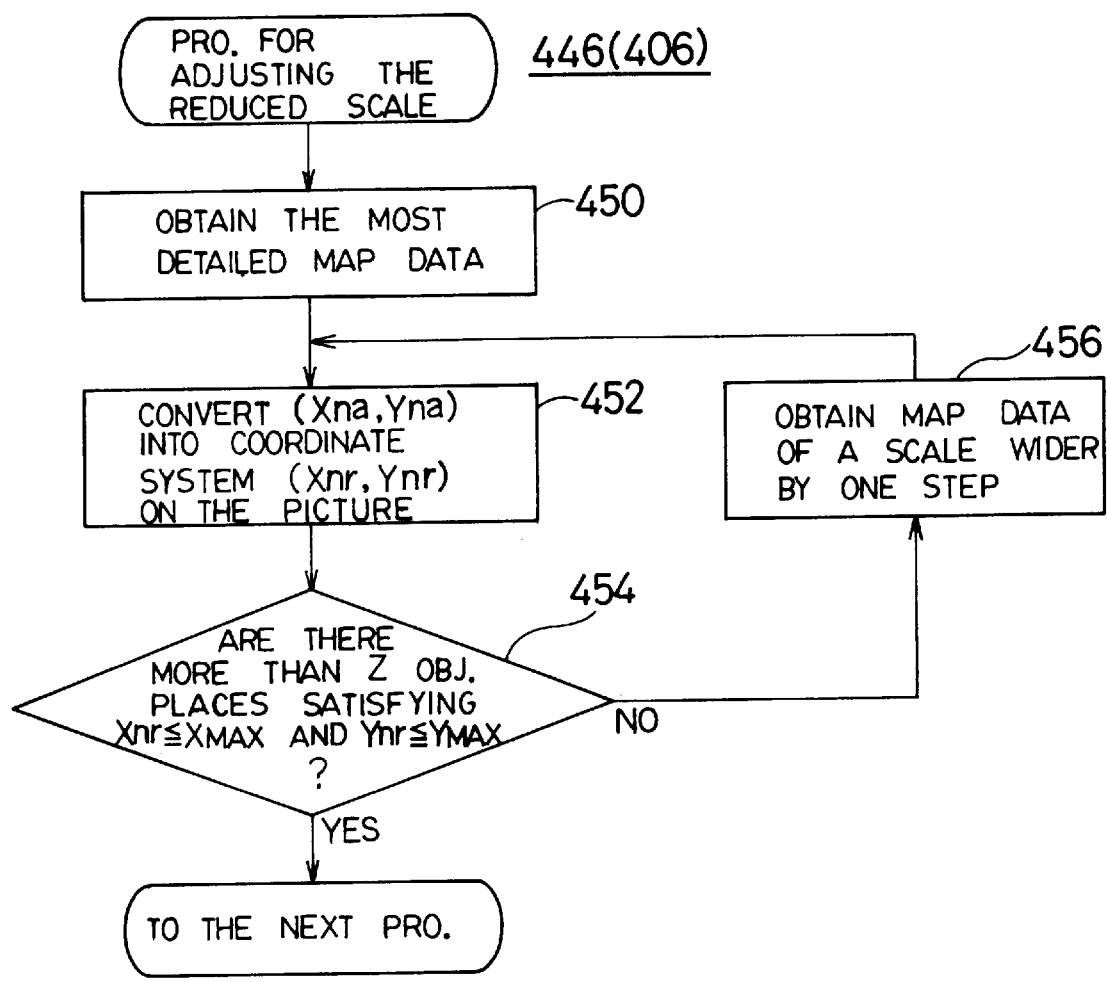
FIG. 26 is a flow chart illustrating the processing for adjusting the scale executed according to the second embodiment.

FIG. 26 is a flow chart of a processing for adjusting the reduced scale (step 446). In this processing, the scale is stepwisely reduced from the most detailed map, i.e., from the greatest scale. A reduced scale is selected to indicate more of the objective places to be searched than the predetermined number Z. In the following description, Z is 3. The value Z has been stored in the ROM 3 or 5 in advance. The value Z is not limited to 3, as a matter of course.

In the processing shown in FIG. 26, the CPU 2, first, reads the map data of the most detailed scale of 1 to 10,000 (step 450). The data (Xna, Yna) of the above-mentioned n coordinate differences are converted into coordinates on the coordinate system of the map data (step 452). The data (Xna, Yna) of coordinate differences are those of coordinate differences on the map that had been indicated when the processing for indicating the objective places (step 406) was started. Therefore, the data of coordinate differences must be converted according to the reduced scale of 1 to 10,000. When the scale of the map is K times, the data (Xnr, Ynr) of coordinate differences after the conversion become (Xna, Yna)/K. The conversion processing is executed for all data of coordinate differences (X1a, Y1a), - - - , (Xna, Yna) of n objective places to be searched.

Figure 27:
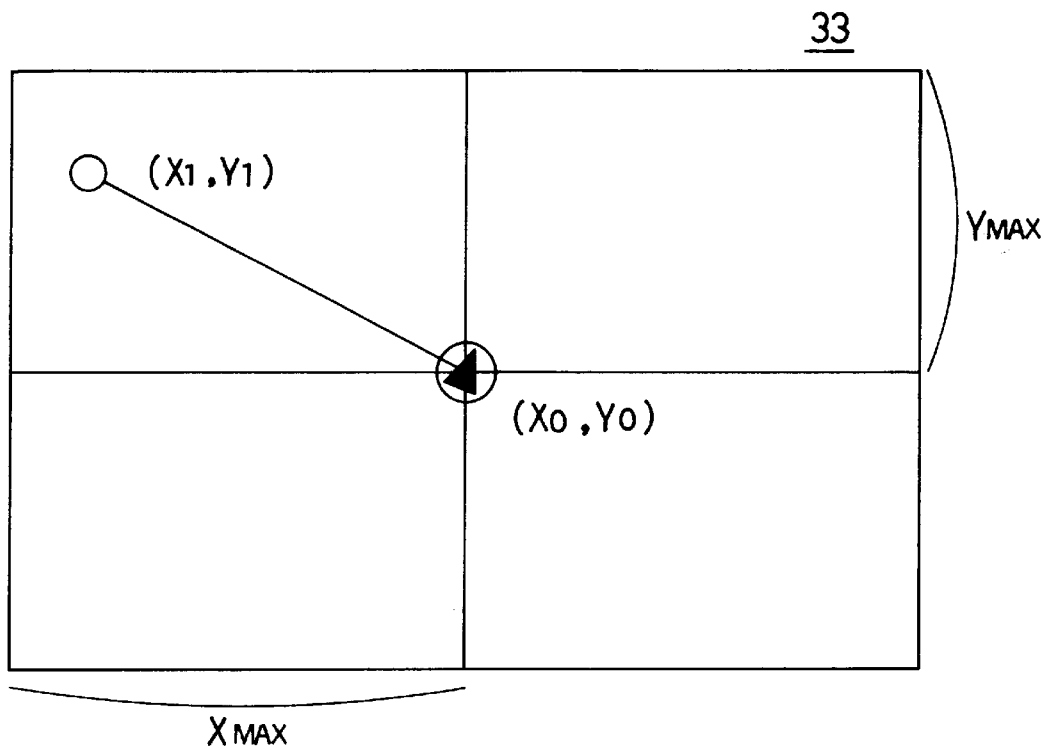
FIG. 27 is a diagram illustrating coordinates of a present position and an objective place indicated on the display 33.

Next, a map picture of the reduced scale of 1 to 10,000 is set with the present position as a center. It is then discriminated whether there are not less than three data (Xna, Yna) of coordinate differences (step 454). Referring to FIG. 27, the picture of a frame is shown on the display 33, the center of the picture being the present position (X0, Y0). The length of coordinates in the X-direction from the center of the picture to an end of the picture is denoted by XMAX, and the length of coordinates in the Y-direction from the center of the picture to an end of the picture is denoted by YMAX. XMAX and YMAX have been calculated in advance for the map of each scale and have been stored in the ROM 3 or 5. It is discriminated whether the relations Xnr≦XMAX and Ynr≦YMAX hold or not for the data (X1r, Y1r), - - - , (Xnr, Ynr) of coordinate differences. The objective places satisfying these conditions are indicated on the picture. It is further discriminated whether there are not less than three objective places satisfying these conditions.

When the result of discrimination at the step 454 is no, the CPU 2 reads the map data of a scale of 1 to 20,000 which is wider by one step (step 456). The data (X1r, Y1r), - - - , (Xnr, Ynr) of coordinate differences are converted into coordinate differences on the map of the scale of 1 to 20,000 (step 452). It is then discriminated whether the relations Xnr≦XMAX and Ynr≦YMAX hold or not for the data (X1r, Y1r), - - - , (Xnr, Ynr) of all coordinate differences. It is further discriminated whether there are not less than three objective places satisfying these conditions (step 454). Similarly, hereinafter, the reduced scale of the map is shifted toward the wider side step by step until not less than three objective places are included in the picture on the display 33. When there are not less than three objective places on the picture, the result of discrimination at the step 454 becomes yes. Then, the objective places satisfying the conditions Xnr≦XMAX and Ynr≦YMAX are indicated on the display 33 as the objective places to be searched (step 448 of FIG. 25).

Figure 28:
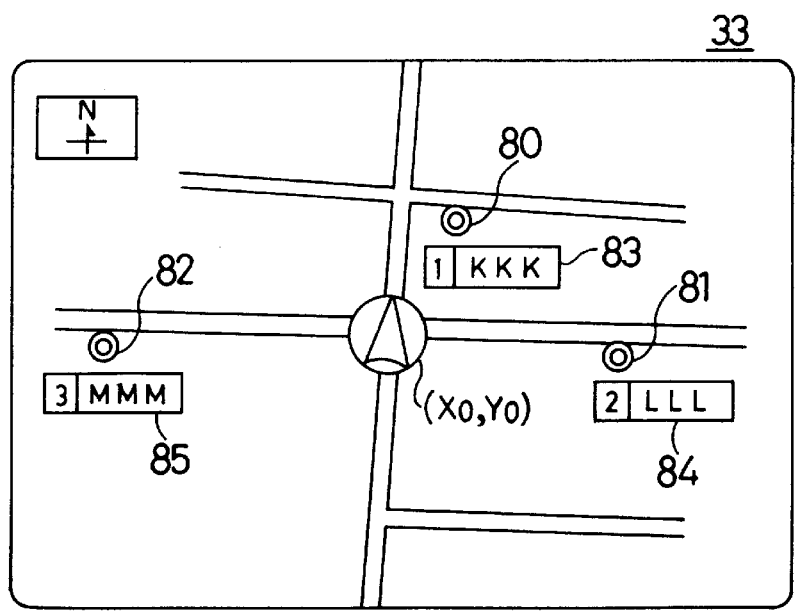
FIG. 28 is a picture of the display 33 on which objective places are indicated.

When the result of the step 454 becomes yes, the map of a reduced scale at this moment is shown on the display 33. The center of picture at this moment is the present position (X0, Y0). The objective places to be searched are indicated on the picture. Referring, for example, to FIG. 28, marks 80 to 82 representing not less than three objective places are indicated on the display 33. Near the marks 80 to 82 representing the objective places, names 83 to 85 of the objective places are indicated. The names 83 to 85 are further attached the numerals in an increasing order of distance from the present position (X0, Y0).

The above-mentioned area to be searched is within a range of picture of the smallest scale (step 432 of FIG. 24), and not less than three objective places have been confirmed at the step 437 of FIG. 24. Therefore, the steps 452, 454 and 456 are repeated and when the map of the smallest scale is finally shown, not less than three objective places are necessarily indicated.

24. Processing for Storing Objective Places (Second Embodiment)

Figure 29:
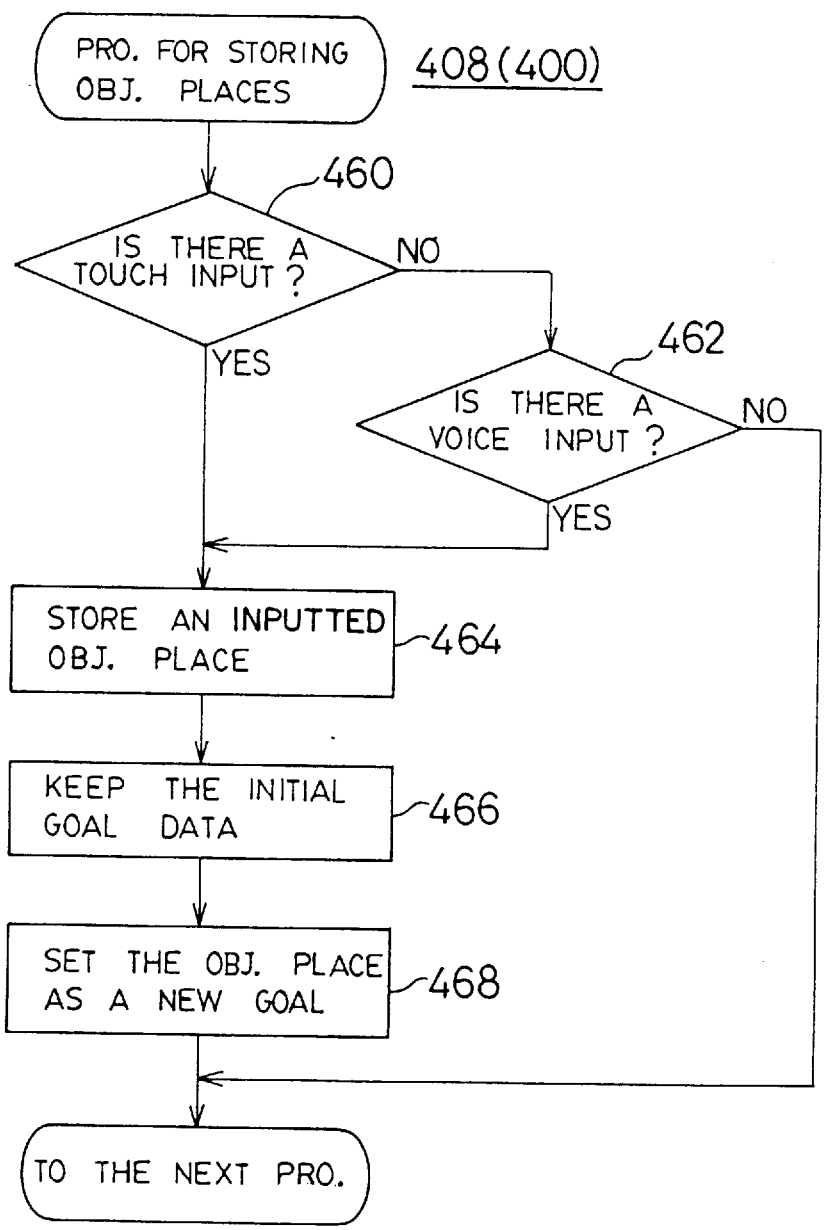
FIG. 29 is a flow chart illustrating the processing for storing objective places executed according to the second embodiment.

FIG. 29 is a flow chart of a processing for storing the objective places (step 408). After the objective places to be searched are indicated on the display 33, the processing for storing the objective places (step 408) is started. Referring to FIG. 28, for instance, the user touches one of the marks 80 to 82 of the objective places (step 460), or the user inputs by voice one of the numerals attached to the names 83 to 85 of the objective places (step 462). Thus, a place to drop in is determined.

When there is a touch input or a voice input within a predetermined standby period, the data SP of the selected objective place are stored in the RAM 4 (step 464). The CPU 2 transfers the data TP of the initial goals set by the processing for setting the goals to a keeping area MK in the RAM 4 (step 466). Thus, the data related to the initial goals are preserved. The data TP of the initial goals are those of the final goal and the passing places, and have been set by the processing for setting the goals (step 51 of FIG. 5) before the departure. Then, the data SP related to the objective place is stored in the RAM 4 as the data TP of a new goal (step 468). Thus, the objective places turn into new goals. The center of picture of the display 33 is returned back to the present position.

Then, the processing for searching routes to the goals (step 52) and the processing for indicating the guide (step 53) are executed. Thus, the guide route is indicated up to the objective place, and the navigation to the objective place that is designated by the user is carried out. When the car arrives at the objective place, the data of the initial goals that had been kept are returned back again to the data TP of the goals. Then, the navigation is executed again up to the goals.

When the present position is moved by more than a predetermined distance during the standby period for input at the step 460 or 462, or when a predetermined period of time has lapsed, the processing 446 is executed to adjust the reduced scale. Therefore, when the number of objective places indicated on the display 33 decreases accompanying the motion of the car, the reduced scale is adjusted so that there are indicated not less than three objective places.

The data of the initial goals that had been kept may be set to the data TP of the goals when the user executes the operation to restore the goals. Moreover, the objective places may be set as passing places in the way to the initial goal, and the route that leads to the initial goal via this objective place may be used as a new guide route.

25. Third Embodiment

Figure 30:
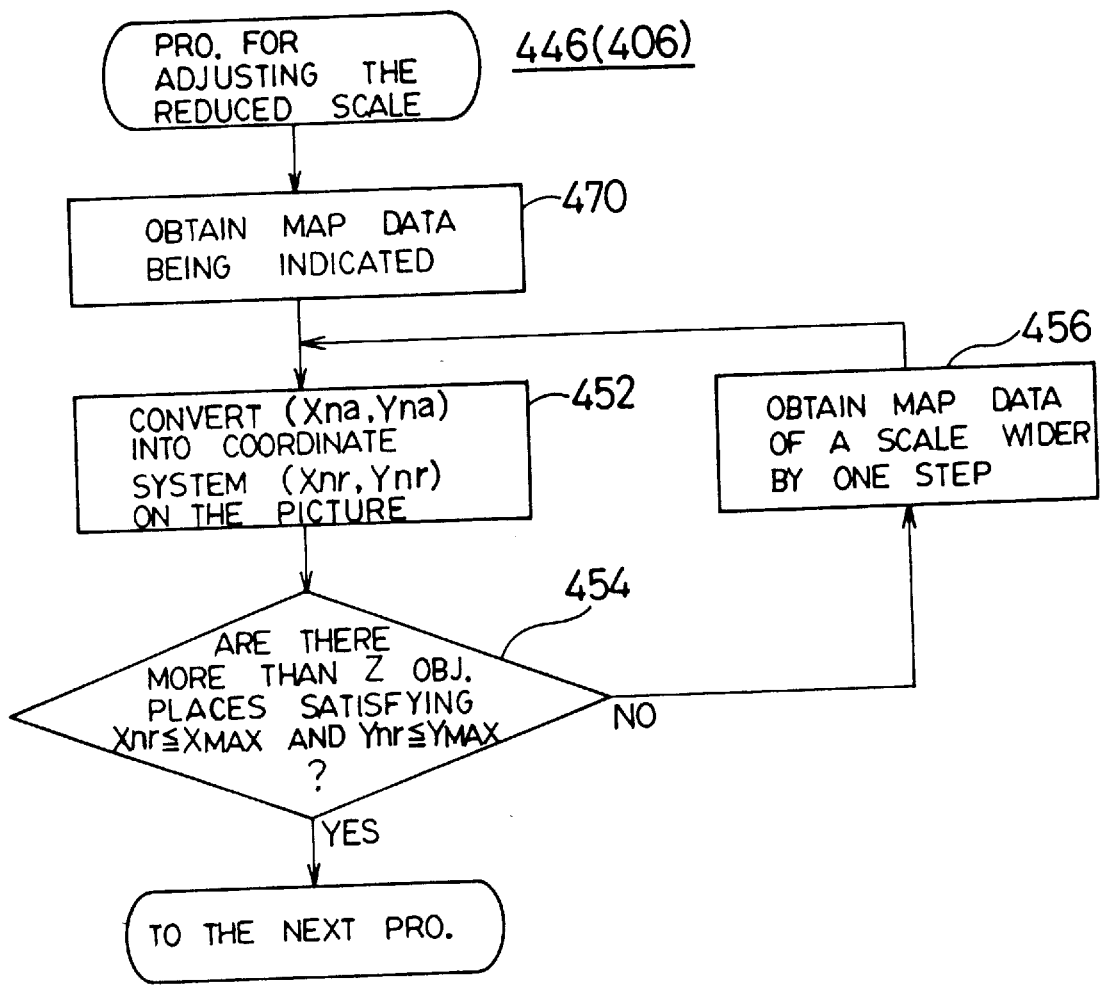
FIG. 30 is a flow chart illustrating the processing for adjusting the scale executed according to a third embodiment.

According to a third embodiment, a processing (step 446) shown in FIG. 30 is executed instead of the processing for adjusting the reduced scale (step 446) of the second embodiment. The constitution and processings of the third embodiment, except the above processing, are the same as those of the second embodiment. FIG. 30 illustrates a flow chart of the processing for adjusting the reduced scale (step 446) according to the third embodiment. In FIG. 30, the same steps as those of the processings of FIG. 26 are denoted by the same reference numerals.

In this processing, a step 470 is executed instead of the step 450 of FIG. 26. At step 470, the map data shown on the display 33 are read out. The map is the one that is shown when the processing for indicating the objective places (step 406) is started. Therefore, the scale of the map picture shown on the display 33 is stepwisely decreased until not less than three objective places are indicated.

In the processing of FIG. 26, the map is stepwisely shifted from the greatest scale toward the smaller scales. Therefore, the scale of the map that is shown often becomes greater than the scale of before the processing for setting the objective places is started. According to the processing shown in FIG. 30, on the other hand, the scale of the map that is shown does not become larger than the scale of before the processing for setting the objective places is started.

26. Fourth Embodiment

Figure 31:
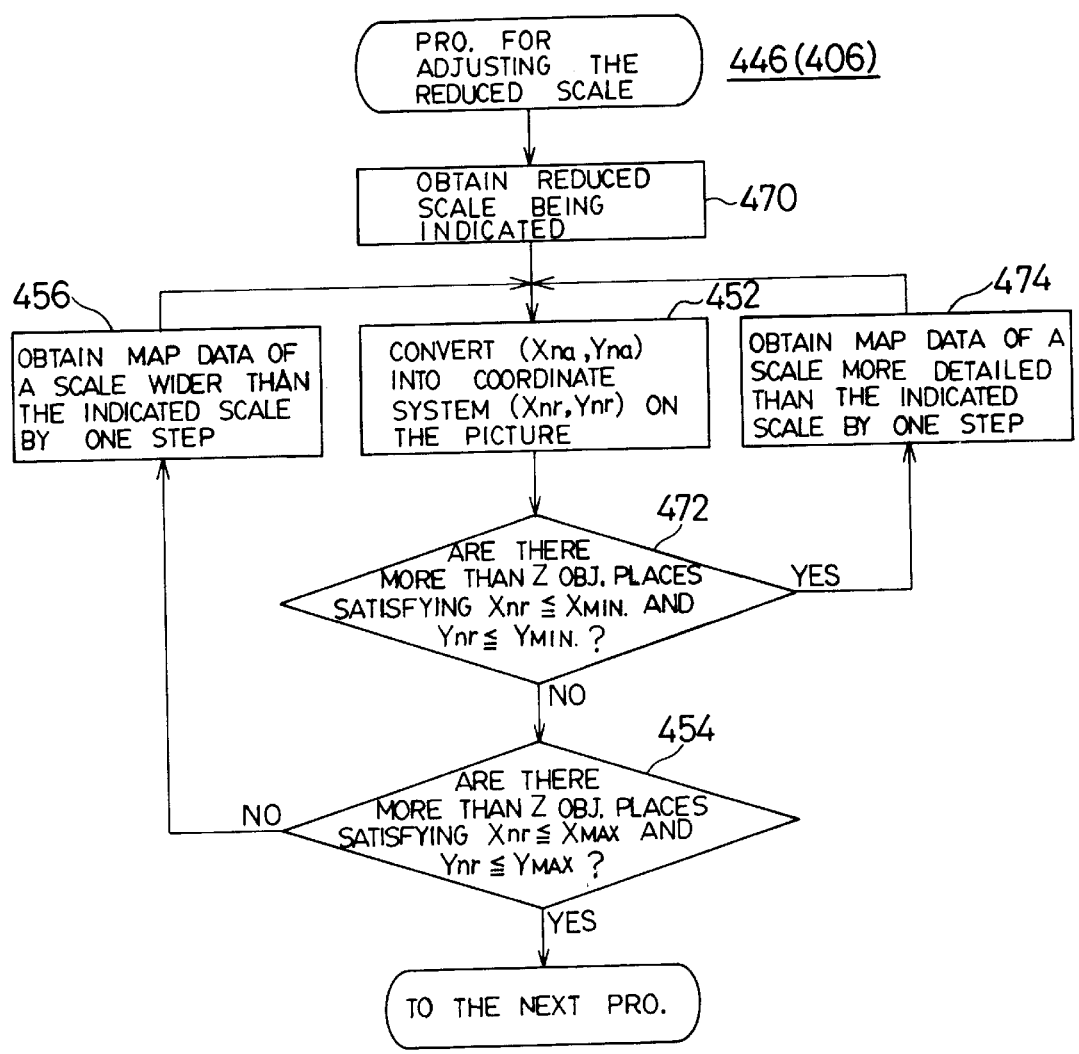
FIG. 31 is a flow chart illustrating the processing for adjusting the scale executed according to a fourth embodiment.

According to a fourth embodiment, a processing (step 446) shown in FIG. 31 is executed instead of the processing for adjusting the reduced scale (step 446) of the second embodiment. The constitution and processings of the fourth embodiment, except the above processing, are the same as those of the second embodiment. FIG. 31 illustrates a flow chart of the processing for adjusting the reduced scale (step 446) according to the fourth embodiment. In FIG. 31, the same steps as those of the processings of FIGS. 26 and 30 are denoted by the same reference numerals.

In this processing, a step 472 is inserted before the step 454 of FIG. 30. The step 472 discriminates whether there are coordinate data (Xna, Yna) of not smaller than three objective places in a small area 90 shown in FIG. 32. The CPU 2 reads the map data at the steps 470, 474 and 456. Then, the map is shown on the display 33, and the present position is brought to the center. The small area 90 is shown on the picture.

Figure 32:
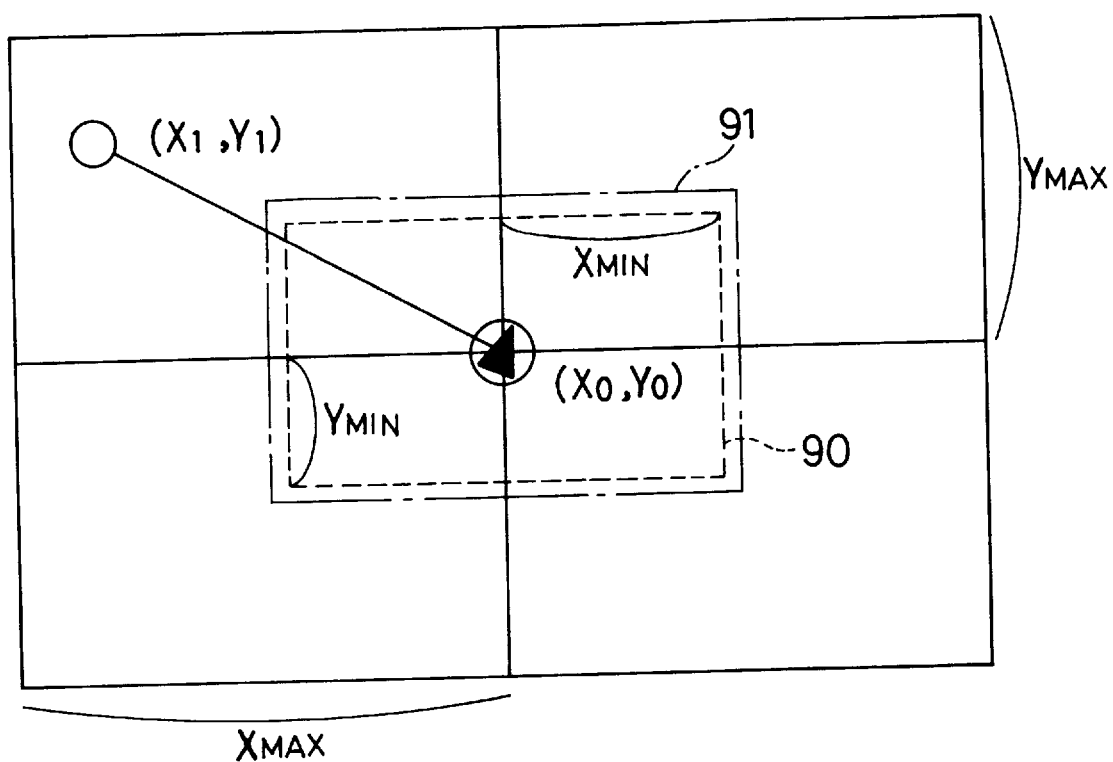
FIG. 32 illustrates a picture of the display 33 on which a small area 90 is shown.

The length of coordinates in the X-direction from the center of the picture to an end of the small area 90 is denoted by XMIN, and the length of coordinates in the Y-direction from the center of the picture to an end of the small area 90 is denoted by YMIN. XMIN and YMIN have been calculated in advance for each of the reduced scales, and have been stored in the ROM 3 or 5. Here, however, the small area 90 is not provided in the map of the largest scale of 1 to 10,000. When the reduced scale is increased by one step, an area 91 shown in FIG. 32 is indicated on the picture. The small area 90 is equal to, or is slightly narrower than, the area 91.

The step 472 then discriminates whether the relations $Xnr \leq XMIN$ and $Ynr \leq YMIN$ hold or not for the data (X1r, Y1r), - - -, (Xnr, Ynr) of all coordinate differences. It is further discriminated whether there are not smaller than three objective places satisfying these conditions. When the discriminated result of this step 472 is yes, the CPU 2 reads the map data of a scale which is increased by one step (step 474). The scale of the map is stepwisely increased until the result of the step 472 becomes no. Here, however, the small area 90 is not provided for the map of the smallest scale of 1 to 10,000. When the step 472 consecutively produces the discriminated result which is yes, therefore, the map of a reduced scale of 1 to 10,000 is finally shown.

When the discriminated result at the step 472 is no, on the other hand, the processings of steps 454 and 456 are executed. Therefore, the scale of the map is stepwisely decreased until there are indicated not smaller than three objective places to be searched. As described above, the small area 90 is equal to, or is slightly narrower than, the area 91. Therefore, the processings of the steps 472→474→452→472→454→456→452→472→474→ - - - are not repeated.

When, for example, not smaller than three objective places to be searched are indicated, it often happens that not smaller than three objective places to be searched are densely located surrounding the present position. In this case, the map is enlarged so that the user is allowed to easily search the nearest objective place. When there are not smaller than three objective places to be searched within the small area 90, the objective places to be searched outside the small area 90 are not indicated. Usually, however, a place where the user may drop in on is close to the present position. This embodiment therefore is reasonable.

27. Fifth Embodiment

Figure 33:
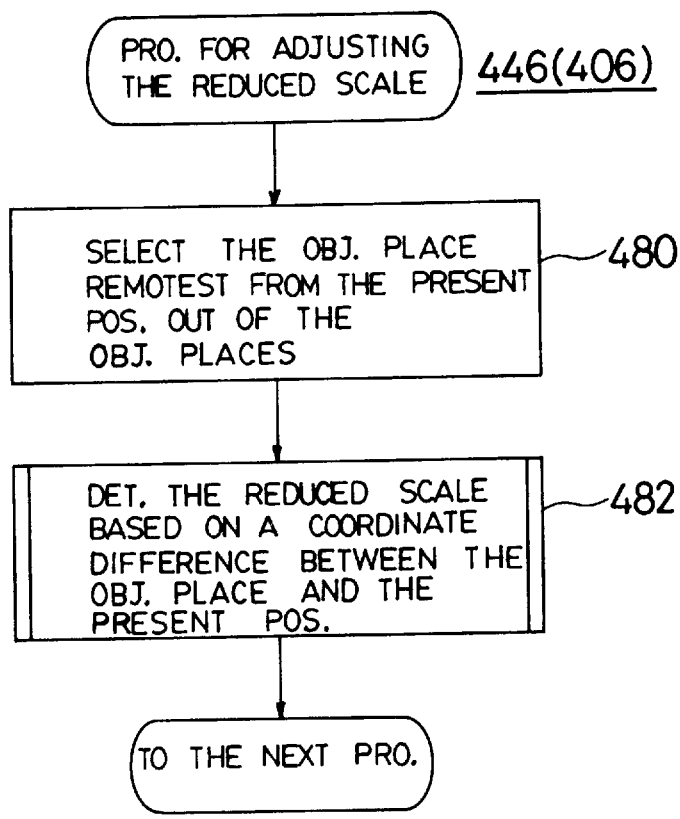
FIG. 33 is a flow chart illustrating the processing for adjusting the scale executed according to a fifth embodiment.

According to a fifth embodiment, a processing (step 446) shown in FIG. 33 is executed instead of the processing for adjusting the reduced scale (step 446) of the second embodiment. The constitution and processings of the fifth embodiment, other than the above processing, are the same as those of the second embodiment. FIG. 33 illustrates a flow chart of the processing for adjusting the reduced scale (step 446) according to the fifth embodiment.

In this processing, the amounts of data (X1a, Y1a), - - -, (Xna, Yna) of n coordinate differences calculated at the above-mentioned step 444 are compared with each other. The greatest coordinate difference (Xka, Yka) is found among them and is stored in the RAM 4 (step 480). Based upon the maximum coordinate difference (Xka, Yka), an optimum reduced scale is selected from the memory table (step 482).

The maximum coordinate difference (Xka, Yka) is a value that corresponds to the reduced scale of when the processing for indicating the objective places to be searched (step 406) is started. At the step 482, the maximum coordinate difference is converted into a practical distance L between the present position and the objective place to be searched. The data of coordinate difference are converted into the length of a straight line according to Pythagorean theorem, and are divided by a reduced scale of the map that is shown. Thus, the distance L is found. The distance data L are stored in the RAM 4.

The ROM 3 or 5 stores a data table that is shown in FIG. 34. The data table contains the distances L between the present position and the objective place having a maximum coordinate difference, as well as a reduced scale of the map in a manner being corresponded to each other. Then, the step 482 determines the reduced scale relying upon the distance L found from the data table. The map data of this reduced scale are read by the CPU 2 and are sent to the image processor 9. As described earlier, the area KA to be searched defines the range of the map picture having the greatest scale (steps 432, 436). Therefore, the objective place having the maximum coordinate difference is indicated on the picture of at least the maximum scale.

According to this embodiment as described above, the reduced scale is not stepwisely adjusted but is determined by one time of selection based on the maximum coordinate difference. Therefore, the objective places to be searched are indicated within a short period of time after the start of the processing for setting objective places to be searched.

28. Sixth Embodiment

In the above-mentioned second to fifth embodiments, not less than three objective places to be searched are indicated on the display 33. The user, therefore, is allowed to compare the distances from the present position to the objective places to be searched. The user, however, is unable to obtain data related to the contents of the objective places. The contents of the objective places may not often meet the desire of the user. According to the sixth embodiment, therefore, the order of priority is imparted depending upon the contents of the objective places. The sixth embodiment is a combination of the first embodiment with the second to fifth embodiments.

The whole circuit, data file, objective place data file, register and whole processing of the sixth embodiment are the same as those shown in FIGS. 1 to 5. The sixth embodiment executes the processing for setting objective places (step 100) shown in FIG. 6, processing for determining the reference for search (step 102) shown in FIG. 7, processing for determining the reference position (step 104) shown in FIG. 8, processing for automatic setting (step 142) shown in FIG. 9, processing for correcting the reference position (step 146) shown in FIG. 10, processing for determining the order of priority (step 108) shown in FIG. 12, processing for changing the distances to the objective places (step 208) shown in FIGS. 13 and 14, processing for determining the order of priority (step 210) shown in FIG. 15, and processing for storing objective places (step 112) shown in FIG. 21.

Figure 35:
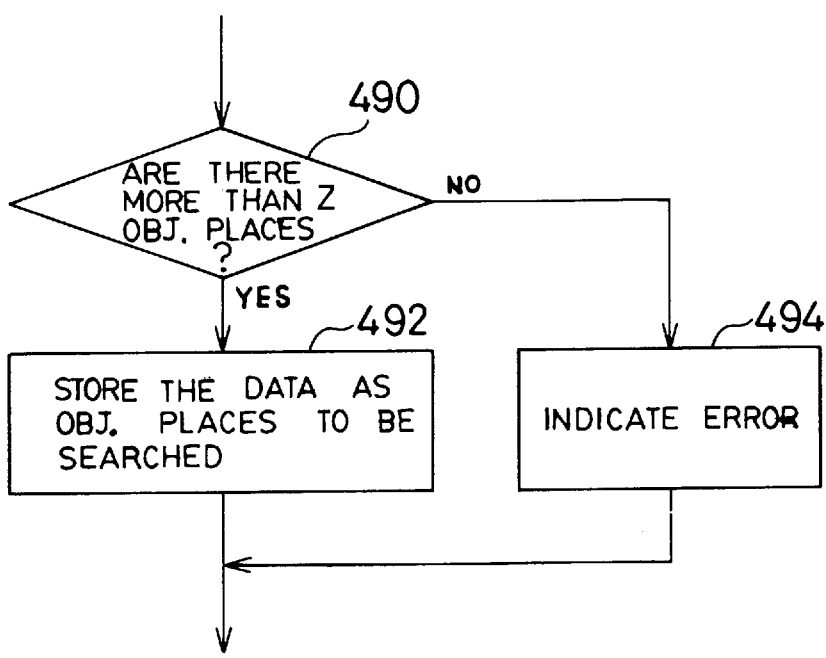
FIG. 35 shows a part of a flow chart illustrating the processing for searching objective places executed according to a sixth embodiment.

In this embodiment, steps 490, 492 and 494 shown in FIG. 35 are inserted after the step 194 of the processing for searching objective places (step 106) shown in FIG. 11. At the steps 180 to 190 of FIG. 11, the area KA to be searched that is designated by the user is stored in the RAM 4. Then, the genre code number data JC are read at the step 192. At the step 194, the objective places are searched that conforms to the genre designated by the user.

At the step 490 shown in FIG. 35, it is discriminated whether there are not less than Z objective places to be searched. When there are not less than Z objective places to be searched, then, the name data MM of objective places in the area to be searched, phone number data MT, coordinate data MZ and information data MD are read out and are stored in the RAM 4 as data KM related to the objective places to be searched (step 492). When less than Z objective places to be searched exist in the area to be searched, this fact is informed by error indication and voice (step 494).

According to this embodiment, the processing for indicating the objective places (step 406) of the second to fifth embodiments is executed in the processing for indicating the objective places (step 110 of FIG. 6), and in which is further executed any one of the processings for adjusting the reduced scale (step 446 of FIGS. 26, 30, 31, 33) of the above-mentioned embodiments.

Accordingly, the reduced scale of the map is so adjusted as to indicate not less than three objective places to be searched. On the map picture, marks representing the objective places to be searched are indicated. Near the marks of the objective places, further, names of the objective places are indicated. Moreover, the order of priority is attached to the names of the objective places. By making reference to the order of priority, the user determines a place to drop in out of the objective places being searched. The user then performs the operation to set the objective places (step 112). Thus, the user is allowed to determine within a short period of time the objective place that conforms to the requirements desired by the user.

29. Seventh Embodiment

Figure 36:
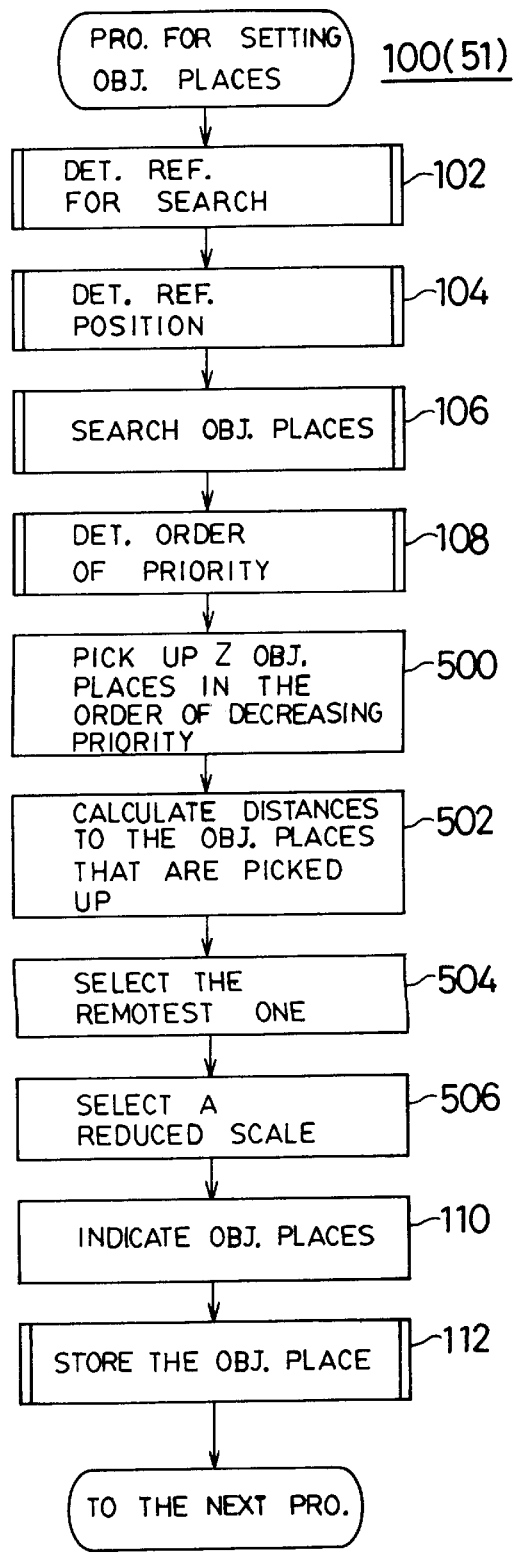
FIG. 36 is a flow chart illustrating the processing for setting objective places executed according to a seventh embodiment.

According to the above-mentioned sixth embodiment, the objective places having higher priorities but which are remote from the reference position are not often indicated, but, instead, objective places having lower priorities and close to the reference position are often indicated. According to a seventh embodiment, therefore, objective places of a number of Z having higher priorities are picked up. The seventh embodiment executes a processing shown in FIG. 36 instead of the processing shown in FIG. 6. In this processing, steps 500 to 506 are inserted between the step 108 and the step 110 in the processing of FIG. 6.

At the step 108, the order of priority is determined. Then, the data UN related to the order of priority are read out from the RAM 4, and the amounts of the data UN related to the order of priority are compared. The objective places of a number of Z are searched in the order of decreasing priority (step 500). Distances are calculated up to Z objective places from the reference position (step 502). An objective place which is the remotest from the reference position is selected out of Z objective places (step 504). The distance to the remotest objective place is stored in the RAM 4 as the distance data L. A reduced scale of the map corresponding to the distance data L is found from the data table shown in FIG. 34 (step 506).

Next, the objective places of the number of Z are indicated on the map picture of the selected scale (step 110). The user selects an objective place by making reference to the order of priority (step 112). According to this embodiment as described above, the objective places of a number of Z are picked up in the order of decreasing priority, and the scale of the map is adjusted. Thus, the Z objective places that are picked up are indicated. Therefore, the objective places which have higher priorities but are remote from the reference position are even indicated.

30. Eighth Embodiment

According to the fifth embodiment, the range of the area to be searched is the one in which the map of the largest scale is shown on the display 33 (step 432 of FIG. 24). According to an eighth embodiment, on the other hand, the range of the area to be searched is not determined but the objective places that correspond to a designated genre are all searched. However, an objective place which is the remotest from the present position may not often be indicated in the map picture of the largest scale. When the distance L to the objective place remotest from the present position exceeds the range of the map picture of the largest scale of 1 to 640,000, therefore, a predetermined reduced scale is selected (lowermost column in FIG. 34). When the distance L is not less than 20000 meters, therefore, the reduced scale of the map is selected to be 1 to 80,000, and only those objective places included in the map picture of this scale are indicated.

31. Ninth Embodiment

Figure 37:
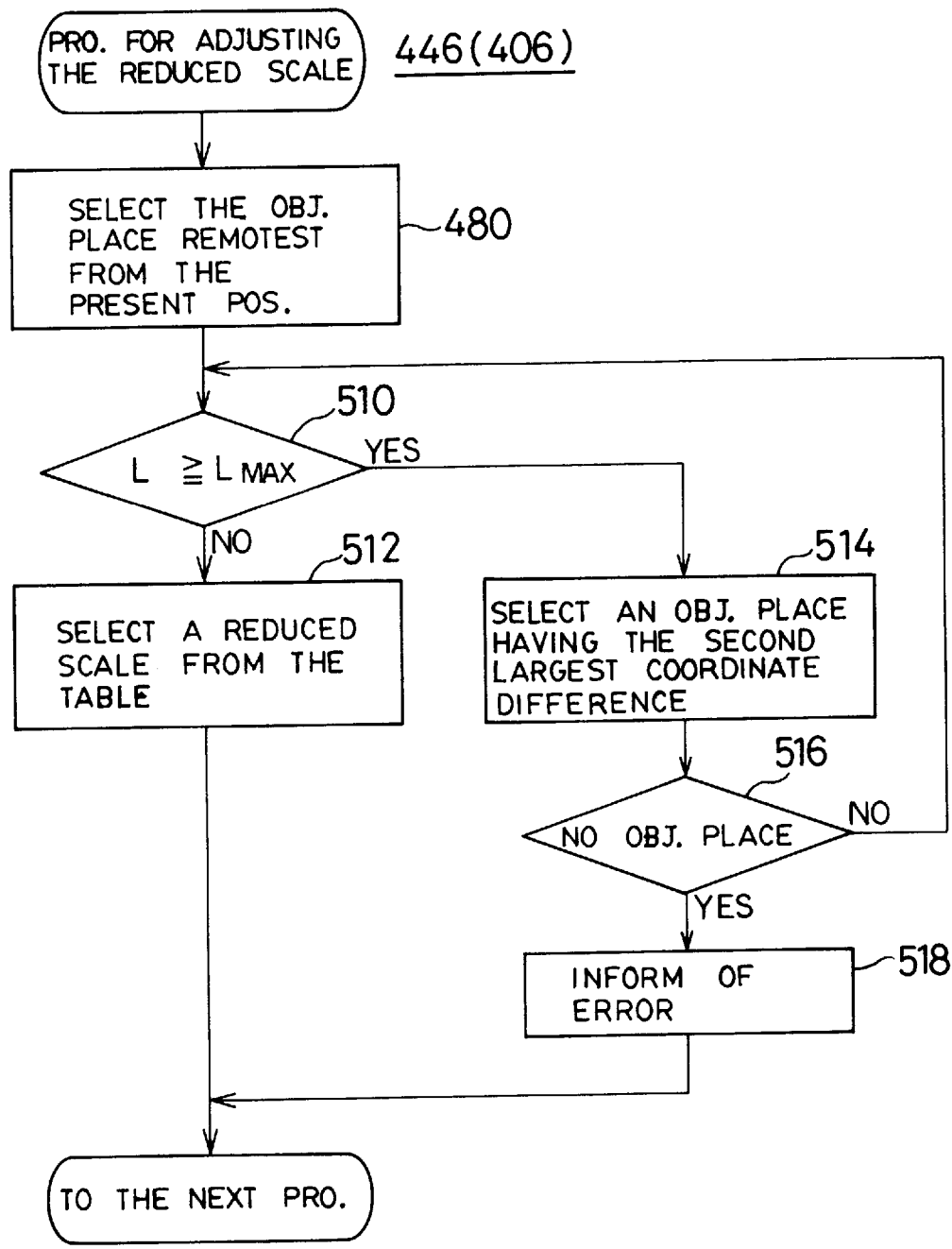
FIG. 37 is a flow chart illustrating the processing for adjusting the scale executed according to a ninth embodiment.

A ninth embodiment executes a processing shown in FIG. 37 instead of the processing shown in FIG. 33. At a step 480, first, an objective place which is the remotest from the present position is selected. It is then discriminated whether the distance L to the remotest objective place is greater than the predetermined distance LMAX or not (step 510). When the table shown in FIG. 34 is used, the predetermined distance LMAX is 20000 meters. When the distance L is smaller than LMAX, a reduced scale corresponding to the distance L is found from the table of FIG. 34 (step 512). When the distance L is greater than LMAX, an objective place which is the second remotest from the present position is selected (step 514). It is then discriminated whether the distance L to the second remotest objective place is smaller than LMAX or not (step 510).

When the distance L to the second remotest objective place is greater than LMAX, then, the objective places which are the third, fourth, - - - , remotest, are selected until there appears an objective place having a distance L smaller than LMAX. It is then discriminated whether the distance L to the selected objective place is greater than LMAX or not (steps 510, 514). When the distances to the objective places searched by the processing for searching objective places (step 404) are all greater than LMAX, an error message is informed (step 518).

32. Other Modified Embodiments

The present invention is in no way limited to the above-mentioned embodiments only but can be modified in a variety of other ways without departing from the gist and scope of the invention. For example, the processings of the steps 470, 452, 472, 454, 456 and 474 shown in FIG. 31 may be executed after the step 454 of FIG. 26 or after the step 454 of FIG. 30. There are thus indicated objective places to be searched in a number of not less than Z in the map picture. And the objective places to be searched are not densely located.

The processings of the steps 480 and 482 shown in FIG. 33 may be replaced by the step 456 or 474 of FIG. 26, 30 or 31. This makes it possible to indicate an objective place which is the remotest from the present position and to reduce the time for adjusting the reduced scale. In this case, the routine may be advanced to the processing next of the step 454 but not next of the step 452 after the processings of the steps 480 and 482.

The predetermined number Z may be any number other than 3 or may be 1. When Z=1, only one objective place to be searched may be indicated on the display 33. When the result at the step 454 does not become yes even on the map of the smallest scale due to large number Z, an error message may be informed. Furthermore, when the result at the step 454 does not become yes even on the map of the smallest scale, the number Z may be decreased by a predetermined number until the result at the step 454 becomes yes. In this case, an error message is informed when Z becomes 0.

In the processing for searching the objective places (step 404) in the above-mentioned embodiments, furthermore, the Z objective places may be selected in the order of increasing distance from the present position or the reference position at a moment when the objective places are searched in the area being searched. Then, the Z objective places to be searched are indicated. A long period of time is consumed when the user selects an objective place out of many objective places to be searched of a number not less than Z.

On the other hand, a short period of time is consumed when the user selects an objective place out of the Z objective places to be searched.

In the above-mentioned embodiments, furthermore, the area to be searched may not be set. In this case, when the objective places to be searched of a number not less than Z are not indicated on the map picture of the largest scale, an error message is informed. The area to be searched may be narrower than the range of the map picture of the largest scale. For example, the range of a predetermined distance from the present position or the reference position may be the area to be searched. Then, the range including the objective places to be searched is limited to the one which is close to the present position or the reference position. The range for selecting the reduced scales, however, becomes narrow. Moreover, the area to be searched may be set by the user.

The processing for determining the order of priority (step 108) may be executed after the processing for adjusting the reduced scale (step 446). Furthermore, the data related to coordinates (X0, Y0) of the present position, coordinates (Xn, Yn) of the objective place, XMAX, YMAX, etc. may be indicated on the coordinates of longitude and latitude. Further, the coordinate differences (Xna, Yna) and the distance L may be calculated using the coordinates of longitude and latitude.

When the sub-reference is not designated, the data MD related to the objective places may not be used. The map data file F1 may store map data of a plurality of reduced scales of not smaller than 7 or not larger than 7. Moreover, the map data may be expanded or contracted by the proportional calculation so as to obtain map data of different reduced scales. The map data may be thinned out when they are contracted. The proportional calculation or the thinning out of data is executed by the steps 456, 474 and 482. The reduced scale of the map may be varied continuously.

Moreover a variety of data files shown in FIG. 2 may be stored in a programmable external storage medium such as floppy disk or the like. The sub-reference data KS is not limited to those items only that are stored in the objective place data MD in the objective place data file F16. For example, a desired item may be set in advance by the user, and the thus set item may be a sub-reference KS.

In the above-mentioned embodiments, the objective places are set. Here, however, the processing for adjusting the reduced scale may be executed and the processing for determining the order of priority may be executed even when the final goal and the passing places are set. In this case, when the goal is indicated on the map picture in the processing for setting the goal (step 51), the processing similar to the above-mentioned processing for setting the objective places (step 100) is executed.

After the step 404 or 406 of FIG. 22, furthermore, the processing for determining the order of priority (step 108) shown in FIG. 12 may be executed. In the second to fifth embodiment, therefore, the order of priority is imparted to the objective places to be searched.

When the objective places to be searched and the order of priority are indicated in the processing for indicating the objective places (step 110), furthermore, a picture of list shown in FIG. 18 may be displayed prior to the map picture of FIG. 17. The picture of list may be changed over to the map picture through a predetermined operation. The order of priority should be indicated in a manner of being easily recognized by the user when the map picture of FIG. 17 or the picture of list of FIG. 18 is being shown. For instance, color, brightness, luminous intensity, size and shape of the marks or names of the objective places are changed depending upon the order of priority, or the indications of them are flashed. This enables the user to visually obtain the data more easily; i.e., the user is able to easily operate the device while driving the car. The order of priority may be pronounced by voice.

The reference position KP may be fixed to the present position or to any predetermined objective place.

In this case, it may not be selected the reference position KP by the user. This makes it possible to decrease the amount of control processing and, hence, to provide a navigation device at a reduced price. The present invention can be applied to the navigation devices designed for use in vehicles other than automobiles, as well as in ships, aircraft, helicopters, and the like. The maps used for the navigation may be marine charts, submarine charts or the like charts other than road maps.

What is claimed is:

1. A navigation device comprising:

goal storage means for storing data descriptive of a plurality of goals and data related to a plurality of goals in relation to each other;

reference position storage means for storing data of reference positions used during searching of the plurality of goals stored in said goal storage means;

search reference data generating means for generating search reference data that serves as a reference for searching the plurality of goals stored in said goal storage means;

goal data reading means for searching and reading the data descriptive of the plurality of goals or the data related to the plurality of goals from said goal storage means which correspond to the search reference data generated by said search reference data generating means;

reference position data reading means for reading reference position data from said reference position storage means;

priority order determining means for determining an order of priority of the plurality of goals based on a relationship between the data of the plurality of goals read by said goal data reading means and the reference position data read by said reference position data reading means; and display means for displaying a plurality of goals according to the search reference data with information related to the order of priority determined by said priority order determining means.

2. A navigation device comprising:

map data storage means for storing map data;

map data reading means for reading the map data from said map data storage means;

goal storage means for storing data descriptive of a plurality of goals and data related to a plurality of goals in relation to the each other;

first search reference data storage means for storing a range of designated contents for distinguishing the plurality of goals;

first search reference data reading means for reading the range of the designated contents from said first search reference data storage means;

second search reference data storage means for storing a geographical range including a present position or a designated reference position as second search reference data;

second search reference data reading means for reading the geographical range from said second search reference data storage means;

goal data reading means for searching and reading from said goal storage means the data descriptive of the plurality of goals that conform to the range of the designated contents read by said first search reference data reading means and the geographical range read by said second search reference data reading means;

priority order determining means for determining an order of priority for the data of the plurality of goals read by said goal data reading means according to the geographical range or the range of the designated contents;

display means for displaying information;

goal indication means for indicating the plurality of goals read by said goal data reading means on the information displayed on said display means;

priority order indication means for indicating, on the information displayed on said display means, information related to the order of priority determined by said priority order determining means in relation to the plurality of goals indicated by said goal indication means;

goal selection means for enabling user selection of a desired goal from the plurality of goals indicated by said goal indication means;

goal storage means for storing data indicative of the desired goal selected via said goal selection means;

route setting means for setting a route to the desired goal represented by the data stored by said goal storage means;

route indication means for indicating the route set by said route setting means on the information displayed on said display means; and guide means for guiding the route indicated by said route indication means.

3. A navigation device comprising:

map data storage means for storing map data;

goal storage means for storing data descriptive of a plurality of goals and data related to a plurality of goals in relation to each other;

first search reference data generating means for generating first search reference data that serves as a search reference for the data descriptive of the plurality of goals, or for the data related to the plurality of goals, for searching for candidate goals of the plurality of goals stored in said goal storage means;

second search reference data generating means for generating second search reference data that serves as a search reference of a present position or of a designated reference position;

goal data reading means for searching and reading as the candidate goals the data descriptive of the plurality of goals from said goal storage means according to the first and second search reference data generated by said first and second search reference data generating means;

reduced scale determining means for automatically determining a reduced scale of a map picture which indicates a predetermined number of, or not less than a predetermined number of, the data of the plurality of goals read by said goal data reading means; and goal indication means for displaying the map picture at the reduced scale determined by said reduced scale determining means by using map data read from said map data storage means and for indicating on the map picture the data descriptive of the plurality of goals read by said goal data reading means.

4. A navigation device comprising:

map data storage means for storing map data;

map data reading means for reading the map data from said map data storage means;

goal storage means for storing data descriptive of a plurality of goals and data related to a plurality of goals in relation to each other;

first search reference data storage means for storing a range of designated contents for distinguishing the plurality of goals;

first search reference data reading means for reading the range of the designated contents from said first search reference data storage means;

second search reference data storage means for storing a geographical range including a present position or a designated reference position as second search reference data;

second search reference data reading means for reading the geographical range from said second search reference data storage means;

goal data reading means for searching and reading from said goal storage means the data descriptive of the plurality of goals that conform to the range of designated contents read by said first search reference data reading means and the geographical range read by said second search reference data reading means;

relative position calculation means for finding a relative positional relationship for the present position or for the designated reference position in relation to the data of the plurality of goals read by said goal data reading means;

reduced scale determining means for automatically determining a reduced scale of a map picture which indicates a predetermined number of, or not less than a predetermined number of, the data of the plurality of goals read by said goal data reading means depending upon the relative positional relationship of the plurality of goals determined by said relative position calculation means;

display means for displaying an image;

goal indication means for indicating on the image displayed on said display means the map picture of the reduced scale determined by said reduced scale determining means by using the map data read by said map data reading means and for indicating on the map picture the data descriptive of the plurality of goals read by said goal data reading means;

goal selection means for enabling user selection of a desired goal from the plurality of goals indicated by said goal indication means;

goal storage means for storing data indicative of the desired goal selected via said goal selection means;

route setting means for setting a route to the desired goal represented by the data stored by said goal storage means;

route indication means for indicating the route set by said route setting means on the image displayed on said display means; and guide means for guiding the route indicated by said route indication means.

5. A navigation device comprising:

map data storage means for storing map data;

goal storage means for storing data descriptive of a plurality of goals and data related to a plurality of goals in relation to each other;

first search reference data generating means for generating first search reference data that serves as a search reference for the data descriptive of the plurality of goals or the data related to the plurality of goals during searching of the plurality of goals stored in said goal storage means;

second search reference data generating means for generating second search reference data that serves as a search reference of a present position of a designated reference position;

goal data reading means for searching and reading the data descriptive of the plurality of goals from said goal storage means according to the first and second search reference data generated by said first and second search reference data generating means;

reduced scale determining means for automatically determining a reduced scale of a map picture which indicates a predetermined number of, or not less than a predetermined number of, the data of the plurality of goals read by said goal data reading means;

goal indication means for displaying the map picture at the reduced scale determined by said reduced scale determining means by using map data read from said map data storage means and for indicating on the map picture the data descriptive of the plurality of goals read by said goal data reading means;

priority order determining means for determining an order of priority of the plurality of goals based on a relationship between the data of the plurality of goals read by said goal data reading means and the second search reference data generated by said second search reference data generating means; and display means for displaying a plurality of goals according to the first search reference data with information related to the order of priority determined by said priority order determining means.

6. A navigation device comprising:

map data storage means for storing map data;

map data reading means for reading the map data from said map data storage means;

goal storage means for storing data descriptive of a plurality of goals and data related to a plurality of goals in relation to each other;

first search reference data storage means for storing a range of designated contents for distinguishing the plurality of goals;

first search reference data reading means for reading the range of the designated contents from said first search reference data storage means;

second search reference data storage means for storing a geographical range including a present position or a designated reference position as second search reference data;

second search reference data reading means for reading the geographical range from said second search reference data storage means;

goal data reading means for searching and reading from said goal storage means the data descriptive of the plurality of goals that conform to the range of the designated contents read by said first search reference data reading means and the geographical range read by said second search reference data reading means;

relative position calculation means for finding a relative positional relationship for the present position or for the designated reference position in relation to the data of the plurality of goals read by said goal data reading means;

reduced scale determining means for automatically determining a reduced scale of a map picture which indicates a predetermined number of, or not less than a predetermined number of, the data of the plurality of goals read by said goal data reading means depending upon the relative positional relationship of the plurality of goals determined by said relative position calculation means;

priority order determining means for determining an order of priority for the data of the plurality of goals read by said goal data reading means depending upon correspondence with the geographical range or the range of the designated contents;

display means for displaying an image;

goal indication means for indicating, on the image displayed on said display means, the map picture at the reduced scale determined by said reduced scale determining means by using map data read by said map data reading means and for indicating on the map picture the data descriptive of the plurality of goals read by said goal data reading means;

priority order indication means for indicating, on the image displayed on said display means, information related to the order of priority determined by said priority order determining means in relation to the plurality of goals indicated by said goal indication means;

goal selection means for enabling user selection of a desired goal from the plurality of goals indicated by said goal indication means;

goal storage means for storing data indicative of the desired goal selected via said goal selection means;

route setting means for setting a route to the desired goal represented by the data stored by said goal storage means;

route indication means for indicating the route set by said route setting means on the image displayed on said indication means; and guide means for guiding the route indicated by said route indication means.

7. The navigation device according to claim 1, wherein said priority order determining means further determines the order of priority based upon road data input from at least one external unit via at least one communication medium and upon data related to courses to the plurality of goals such as local data.

8. The navigation device according to claim 1, wherein said display means displays the order of priority together with marks representative of the plurality of goals which correspond to the search reference data in a map picture, indicates the order of priority in the form of a list on said display means and indicates the order of priority by changing, depending on the order of priority, color of the marks of the plurality of goals indicated on the map picture on said display means.

9. The navigation device according to claim 3, wherein said map data storage means stores a plurality of map data of different reduced scales for a same area and said reduced scale determining means stepwisely changes the reduced scale starting from the reduced scale of a map that had been indicated when an operation for setting the plurality of goals is started by a system user and determines a suitable reduced scale of the map picture.

10. The navigation device according to claim 3, wherein said map data storage means stores a plurality of map data of different reduced scales for a same area and said reduced scale determining means stepwisely changes the reduced scale starting from a minimum scale and determines a suitable reduced scale of the map picture.

11. The navigation device according to claim 3, wherein said reduced scale determining means determines the reduced scale of the map picture depending upon a goal which is the remotest from the present position or from the reference position among the plurality of goals read by said goal data reading means.

12. The navigation device according to claim 3, wherein said reduced scale determining means selects a map picture for indicating the plurality of goals of a number not less than 2 or of a predetermined number read by said goal data reading means and further reduces the scale of the map picture when the plurality of goals of a number not less than 2 or of the predetermined number read by said goal data reading means are included in a small area set in the map picture.

13. The navigation device according to claim 1, comprising input means including voice input devices, a touch panel mounted on an indication surface of said display means and switches, wherein data related to an operation carried out by a system user is input through said input means and data related to the reference position or the search reference data are input through said input means.

14. The navigation device according to claim 1, further comprising reference position data changing means for changing the data related to a reference position read by said reference position data reading means depending upon predetermined conditions such as a kind of road on which a vehicle is running, running speed and data related to a network of roads.

15. The navigation device according to claim 1, wherein the search reference data comprises data input from an external unit concerning an upper limit and lower limit, designated range, particular goals that are selected and designated, particular goals that are excluded, kind of the goals and nature of the goals, data input by a system user through manual operation and data that has been stored in advance.

16. The navigation device according to claim 1, wherein the reference position is a present position or a position remote from the present position.

17. The navigation device according to claim 1, wherein the reference position is fixed.

18. The navigation device according to claim 1, wherein the reference position can be corrected or changed.

19. The navigation device according to claim 1, wherein a relationship between the data of the plurality of goals and the reference position data is a geographical relationship related to distance and direction or is a relationship of contents of the data of the plurality of goals.

20. The navigation device according to claim 1, wherein the data descriptive of the plurality of goals are related to kinds of facilities, kinds of buildings, kinds of topography, kinds of contents of goals, or positions, altitudes, depths, sizes, attributes, characters or natures of the goals.

21. The navigation device according to claim 1, wherein the goals are places that had not been regarded to be the goals before departure and are places where a system user wants to visit.

22. The navigation device according to claim 1, wherein the search reference data includes data for searching the goals on a route to a final goal and from a range excluding the route.

23. A navigation system comprising:
- a memory for storing map data and descriptive data of a plurality of navigation goals;
- display means for displaying map images;
- reference point selection means for enabling user selection of a reference point;
- reference data input means for enabling user selection of reference data indicative of a desired category of navigation goals; and
- control means for retrieving from said memory navigation goals which correspond to the user selected reference data, prioritizing the retrieved navigation goals to provide priority data and generating the map images in accordance with the stored map data,
- the displayed map images being centered at the user selected reference point, the retrieved navigational goals being illustrated on the displayed map images with the corresponding priority data.

24. The navigation system of claim 23, wherein said control means automatically selects a scale of the displayed map images such that at least a predetermined number of the retrieved navigational goals are displayed.

25. A storage media which stores computer programs comprising:
- first processing means for generating search reference data that serves as a reference for search during searching of a plurality of goals stored in a goal storage unit which stores data descriptive of the plurality of goals and data related to the plurality of goals in relation to each other;
- second processing means for searching and reading the data descriptive of the plurality of goals or the data related to the plurality of goals from said goal storage unit according to the search reference data generated by said first processing means;
- third processing means for reading reference position data from a reference position storage unit which stores data of reference positions used during searching of the plurality of goals stored in said goal storage unit;
- fourth processing means for determining an order of priority of the plurality of goals based on a relationship between the data of the plurality of goals read by said second processing means and the reference position data read by said third processing means; and
- fifth processing means for displaying the plurality of goals according to the search reference data with information related to the order of priority determined by said fourth processing means.

26. A storage media which stores computer programs comprising:
- first processing means for reading map data from a map data storage unit which stores map data;
- second processing means for reading a range of designated contents from a first search reference data storage unit which stores the range of designated contents for distinguishing a plurality of goals;
- third processing means for reading a geographical range from a second search reference data storage unit which stores the geographical range including a present position or a designated reference position as second search reference data;
- fourth processing means for searching and reading from a goal storage unit which stores data descriptive of a plurality of goals and data related to a plurality of goals in relation to each other, the data descriptive of the plurality of goals that conform to the range of the designated contents read by said second processing means and the geographical range read by said third processing means;
- fifth processing means for determining an order of priority for the data of the plurality of goals read by said fourth processing means according to the geographical range or the range of the designated contents;
- sixth processing means for indicating the plurality of goals read by said fourth processing means on a display which displays information;
- seventh processing means for indicating, on the information displayed on said display, information related to the order of priority determined by fifth processing means in relation to the plurality of goals indicated by said sixth processing means;
- eighth processing means for enabling user selection of a desired goal from the plurality of goals indicated by said sixth processing means;
- ninth processing means for setting a route to the desired goal represented by the data stored by said goal storage unit which stores data indicative of the desired goal selected via said eighth processing means;
- tenth processing means for indicating the route set by said ninth processing means on the information displayed on said display; and
- eleventh processing means for guiding the route indicated by said tenth processing means.

27. A storage media which stores computer programs comprising:
- first processing means for generating first search reference data that serves as a search reference for data descriptive of a plurality of goals, or for data related to a plurality of goals, and for searching for candidate goals of the plurality of goals stored in a goal storage unit which stores data descriptive of the plurality of goals and data related to the plurality of goals in relation to each other;
- second processing means for generating second search reference data that serves as a search reference of a present position or of a designated reference position;
- third processing means for searching and reading as the candidate goals the data descriptive of the plurality of goals from said goal storage unit according to the first and second search reference data generated by said first processing means and said second processing means;
- fourth processing means for automatically determining a reduced scale of a map picture which indicates a predetermined number of, or not less than a predetermined number of, the data of the plurality of goals read by said third processing means; and
- fifth processing means for displaying the map picture at the reduced scale determined by said fourth processing means by using map data read from a map data storage unit which stores map data and for indicating on the map picture the data descriptive of the plurality of goals read by said third processing means.

* * * * *